United States Patent
Toya

(10) Patent No.: US 9,893,767 B2
(45) Date of Patent: Feb. 13, 2018

(54) CONTROL METHOD FOR BATTERY STORAGE APPARATUS, BATTERY STORAGE APPARATUS, AND CONTROL METHOD FOR INFORMATION TERMINAL

(71) Applicant: Panasonic Intellectual Property Management Co., Ltd., Osaka (JP)

(72) Inventor: Shoichi Toya, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/062,975

(22) Filed: Mar. 7, 2016

(65) Prior Publication Data

US 2016/0285516 A1     Sep. 29, 2016

(30) Foreign Application Priority Data

Mar. 23, 2015   (JP) ................................ 2015-059913

(51) Int. Cl.

| | |
|---|---|
| *H04W 4/00* | (2009.01) |
| *H04B 5/00* | (2006.01) |
| *H04W 4/02* | (2009.01) |
| *H02J 7/02* | (2016.01) |
| *H02J 7/00* | (2006.01) |

(52) U.S. Cl.
CPC .......... *H04B 5/0031* (2013.01); *H02J 7/0021* (2013.01); *H02J 7/0027* (2013.01); *H02J 7/0044* (2013.01); *H02J 7/02* (2013.01); *H04W 4/008* (2013.01); *H04W 4/02* (2013.01); *H02J 2007/0096* (2013.01)

(58) Field of Classification Search
USPC ........................................................ 455/41.1
See application file for complete search history.

(56) References Cited

U.S. PATENT DOCUMENTS

| | | | | |
|---|---|---|---|---|
| 2011/0178863 | A1* | 7/2011 | Daigle ............... | G06Q 30/0231 705/14.31 |
| 2012/0101755 | A1* | 4/2012 | Hirasawa .............. | H01M 10/48 702/63 |
| 2012/0299548 | A1* | 11/2012 | Takahashi ........... | H01M 2/1077 320/117 |
| 2014/0097672 | A1* | 4/2014 | Takemura ......... | H01M 10/4257 307/9.1 |
| 2015/0306967 | A1* | 10/2015 | Cohen ................. | B60L 11/1825 701/32.3 |
| 2015/0357837 | A1* | 12/2015 | Takai .................... | H01M 10/44 320/107 |

(Continued)

FOREIGN PATENT DOCUMENTS

WO     2012/165220     12/2012

*Primary Examiner* — Ganiyu A Hanidu
(74) *Attorney, Agent, or Firm* — Greenblum & Bernstein, P.L.C.

(57) ABSTRACT

A control method for a battery storage apparatus including a battery pack includes (a) receiving an identifier for identification of an external battery pack via a near field communicator provided in the battery storage apparatus when the external battery pack is present within a communication range of the near field communicator and (b) outputting a piece of association data, in which the identifier and a piece of apparatus information on the battery storage apparatus are associated with each other, to a server apparatus via a communicator.

18 Claims, 21 Drawing Sheets

(56) References Cited

U.S. PATENT DOCUMENTS

2016/0001748 A1* 1/2016 Moskowitz .............. B60K 1/04
                                                          701/22
2016/0126781 A1* 5/2016 Alexander ............ H02J 7/0013
                                                         320/108
2016/0233560 A1* 8/2016 Kanoh ................ H01M 10/425

* cited by examiner

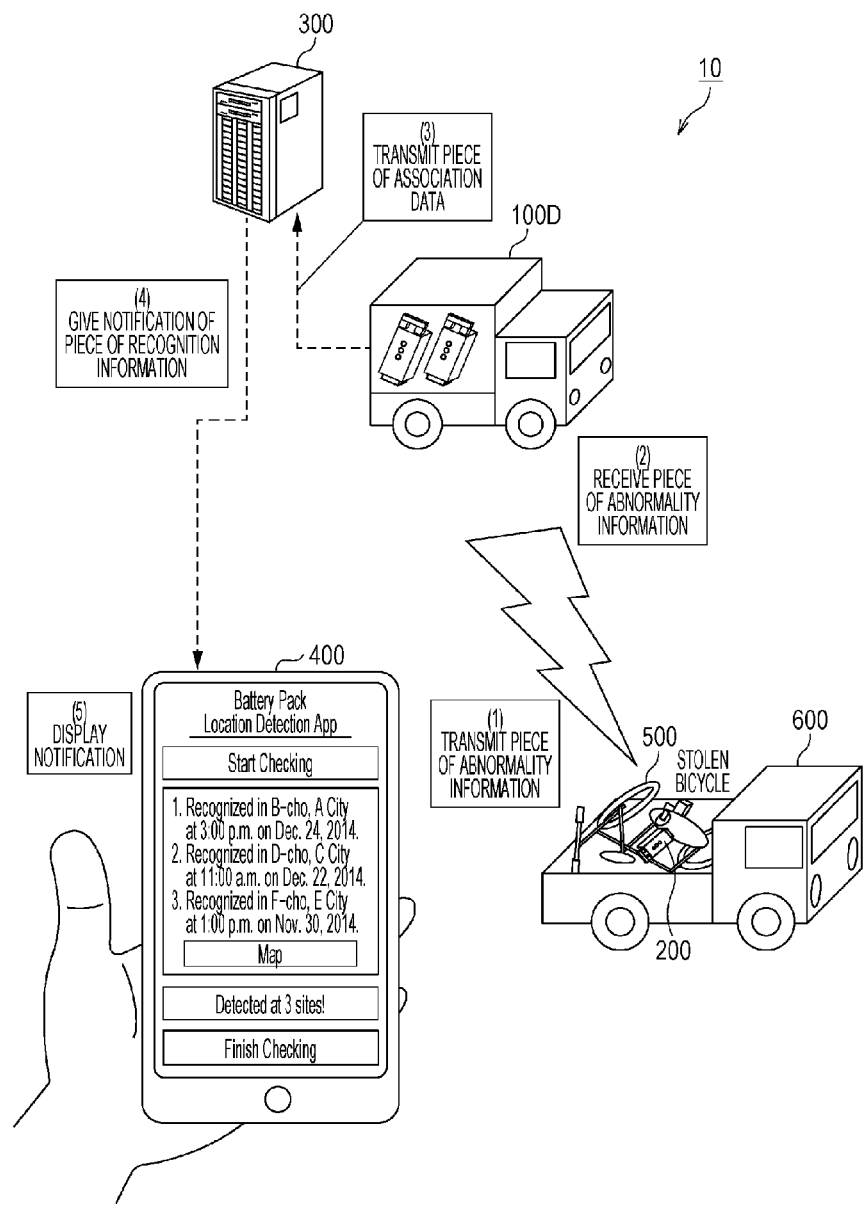

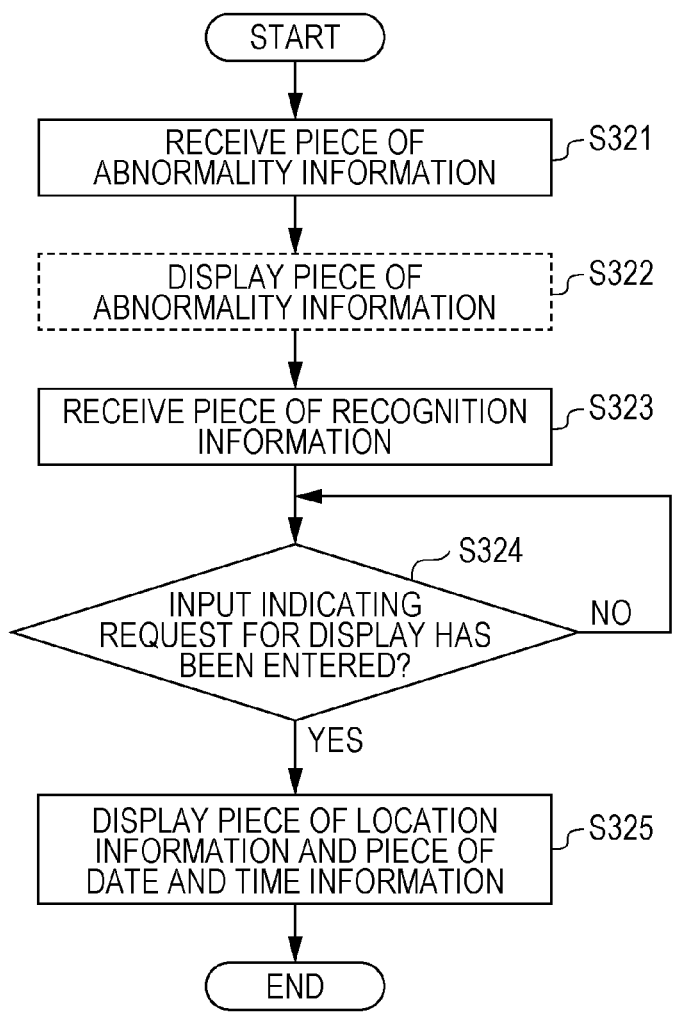

FIG. 13

| IDENTIFIER | DATE AND TIME | LOCATION | ABNORMALITY PRESENCE |
|---|---|---|---|
| xxxxA | DEC. 24, 2014 3:00 P.M. | B-CHO, A CITY | PRESENT |
| xxxxB | DEC. 23, 2014 10:00 A.M. | H-CHO, G CITY | ABSENT |
| xxxxA | DEC. 22, 2014 11:00 A.M. | D-CHO, C CITY | PRESENT |
| xxxxA | NOV. 30, 2014 1:00 P.M. | F-CHO, E CITY | PRESENT |
| xxxxB | NOV. 30, 2014 11:00 A.M. | I-CHO, G CITY | ABSENT |
| ⋮ | ⋮ | ⋮ | ⋮ |

CONTROL METHOD FOR BATTERY STORAGE APPARATUS, BATTERY STORAGE APPARATUS, AND CONTROL METHOD FOR INFORMATION TERMINAL

BACKGROUND

1. Technical Field

The present disclosure relates to a control method for a battery storage apparatus which stores a battery pack, a battery storage apparatus, and a control method for an information terminal.

2. Description of the Related Art

There has been disclosed a battery apparatus (hereinafter referred to as a "battery pack") having an antitheft function (see International Publication No. 2012/165220).

SUMMARY

International Publication No. 2012/165220, however, needs further improvement.

One non-limiting and exemplary embodiment provides an improved battery storage apparatus.

In one general aspect, the techniques disclosed here feature a control method for a battery storage apparatus which stores a battery pack, the control method including (a) receiving an identifier for identification of an external battery pack via a near field communicator provided in the battery storage apparatus when the external battery pack is present within a communication range of the near field communicator and (b) outputting a piece of association data, in which the identifier and a piece of apparatus information on the battery storage apparatus are associated with each other, to a server apparatus via a communicator provided in the battery storage apparatus.

The above-described aspect allows implementation of further improvement.

These general and specific aspects may be implemented using a system and a method, and any combination of systems and methods.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

FIG. 6B is a diagram for explaining another example of the operation of the management system according to the first embodiment;

FIG. 10C is a flowchart for explaining another example of the operation of the information terminal according to the first embodiment;

FIG. 13 is a chart showing an example of a plurality of pieces of association data to be accumulated in the server apparatus according to the first embodiment;

Figure 1:
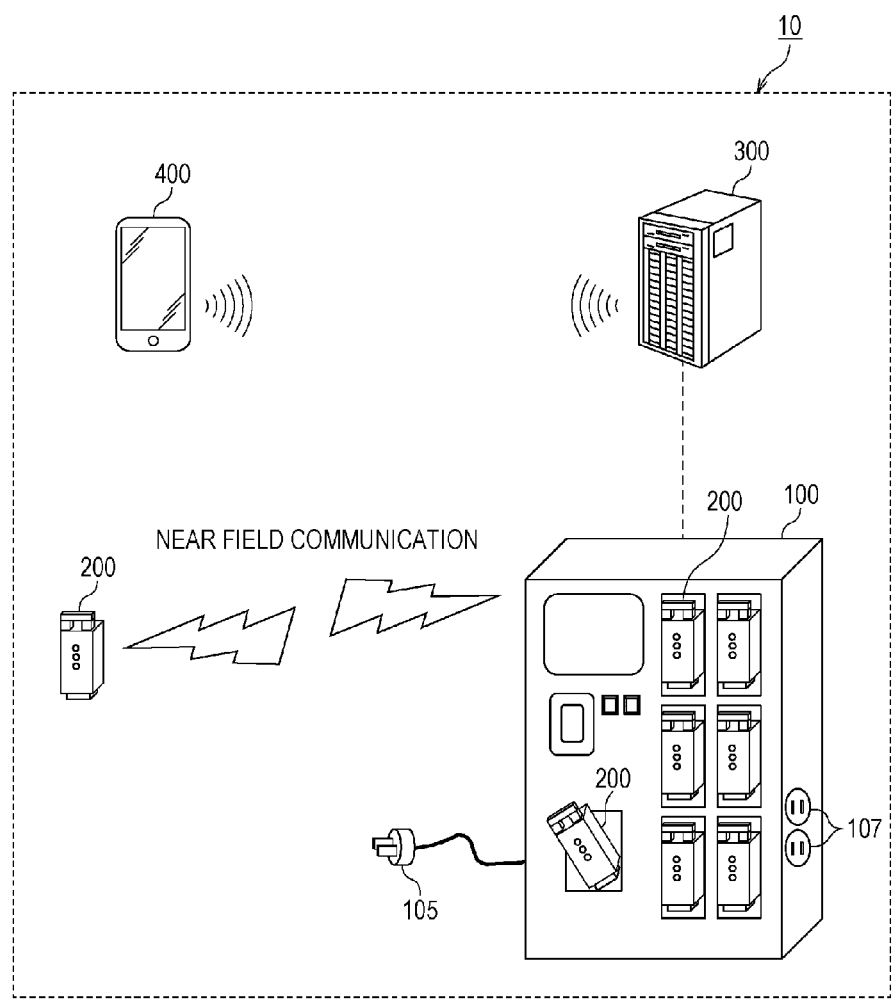
FIG. 1 is a schematic diagram showing the configuration of a management system including a battery storage apparatus according to a first embodiment.

DETAILED DESCRIPTION (Underlying Knowledge Forming Basis of the Present Disclosure)

The present inventor has found out that the battery apparatus described in the "Description of the Related Art" suffers from the problem below.

International Publication No. 2012/165220 discloses that, if a battery pack is connected to a frame apparatus (electronic instrument) for feeding power from the battery pack to a drive of a power-assisted bicycle via a power line, the battery pack performs authentication processing of the frame apparatus by outputting a high-frequency signal via the power line for communication. If a result of the authentication processing shows that authentication of the frame apparatus is unsuccessful, the battery pack does not feed battery power. This configuration disallows an unauthenticated frame apparatus to use the battery pack and allows provision of a high-security antitheft function.

The technique of International Publication No. 2012/165220, however, is incapable of knowing the location of a battery pack if the battery pack is stolen. A user has difficulty recovering the stolen battery pack. That is, the technique of International Publication No. 2012/165220 gives no regard to what to do after theft of a battery pack.

In the light of the foregoing, the present inventor has examined the remedial measures below to solve the above-described problem.

According to a first aspect of the present disclosure, there is provided a control method for a battery storage apparatus which stores a battery pack, the control method including (a) receiving an identifier for identification of an external battery pack via a near field communicator provided in the battery storage apparatus when the external battery pack is present within a communication range of the near field communicator and (b) outputting a piece of association data, in which the identifier and a piece of apparatus information on the battery storage apparatus are associated with each other, to a server apparatus via a communicator provided in the battery storage apparatus.

According to the method, the battery storage apparatus receives the identifier of the external battery pack present within the communication range of the near field communicator and outputs the piece of data, in which the identifier of the external battery pack and the piece of information on the battery storage apparatus are associated with each other, to the server apparatus. This configuration allows a user to obtain a record of communication of the external battery pack with the battery storage apparatus by, for example, inquiring a piece of data of the server apparatus. For example, if the piece of data output to the server apparatus includes a piece of information on a location of the battery storage apparatus, the user can know a location of the external battery pack. That is, since the user can obtain a piece of information for recovering a battery pack owned by the user even if the battery pack is stolen, the battery storage apparatus can reduce occurrence of a situation where the presence of a stolen battery pack is unrecognizable.

A control method for a battery storage apparatus according to a second aspect of the present disclosure is the control method for the battery storage apparatus according to the first aspect, in which the outputting (b) may include outputting a piece of data, in which the identifier, a piece of date and time information on a date and time of reception of the identifier, and the piece of apparatus information are associated with one another, as the piece of association data to the server apparatus via the communicator.

This configuration allows a user to know a piece of date and time information on a date and time of near field communication of an external battery pack with the battery storage apparatus.

A control method for a battery storage apparatus according to a third aspect of the present disclosure is the control method for the battery storage apparatus according to the first or second aspect that may further include (c) receiving power for charging the battery pack from an external power source via a power receiver provided in the battery storage apparatus and (d) charging the battery pack connected to a connector provided in the battery storage apparatus and electrically connected to the battery pack via a charger provided in the battery storage apparatus, using power received from the external power source.

Since the battery storage apparatus can charge a plurality of battery packs using power from the external power source, a user can use the battery storage apparatus as an instrument for charging a battery pack.

A control method for a battery storage apparatus according to a fourth aspect of the present disclosure is the control method for the battery storage apparatus according to any one of the first to third aspects that may further include (e) feeding power of the battery pack to an external electrical instrument via a discharger connected to the external electrical instrument and provided in the battery storage apparatus.

Since the battery storage apparatus can feed power of a plurality of battery packs to the external electrical instrument, a user can use the battery storage apparatus as, for example, an emergency power source.

A control method for a battery storage apparatus according to a fifth aspect of the present disclosure is the control method for the battery storage apparatus according to any one of the first to fourth aspects, in which the receiving (a) may include receiving a piece of abnormality information indicating that the external battery pack has an abnormality in addition to the identifier for identification of the external battery pack via the near field communicator when the external battery pack is present within the communication range of the near field communicator, and the outputting (b) may include outputting the piece of association data and the received piece of abnormality information to the server apparatus via the communicator.

This configuration allows a user to know that an external battery pack has an abnormality.

A control method for a battery storage apparatus according to a sixth aspect of the present disclosure is the control method for the battery storage apparatus according to the fifth aspect, in which the piece of abnormality information may include a piece of information indicating that the external battery pack is stolen.

This configuration allows a user to know that an external battery pack is stolen.

A control method for a battery storage apparatus according to a seventh aspect of the present disclosure is the control method for the battery storage apparatus according to any one of the first to sixth aspects, in which the battery storage apparatus may be separated into a first unit which includes the communicator and a controller, stores the battery pack, and is provided indoors and a second unit which includes the near field communicator and is provided outdoors, the method may further include (f) receiving the identifier transmitted from a transmitter provided in the second unit via a receiver provided in the first unit after the receiving (a), and the outputting (b) may include outputting the piece of association data, in which the identifier and the piece of apparatus information on the battery storage apparatus are associated with each other, to the server apparatus via the communicator upon receipt of the identifier from the receiver.

As described above, the battery storage apparatus is separated into the first unit and the second unit. This configuration allows the second unit that performs near field communication to be arranged outdoors and allows sensitive near field communication with an external battery pack.

According to an eighth aspect of the present disclosure, there is provided a battery storage apparatus which stores a battery pack, the battery storage apparatus including a near field communicator which performs near field communication with an external communicator provided in an external battery pack, a communicator which communicates with a server apparatus, and control circuitry which receives an identifier for identification of the external battery pack via the near field communicator when the external battery pack is present within a communication range of the near field communicator and then outputs a piece of association data, in which the identifier and a piece of apparatus information on the battery storage apparatus are associated with each other, to the server apparatus via the communicator.

According to the above description, the battery storage apparatus receives the identifier of the external battery pack present within the communication range of the near field communicator and outputs the piece of data, in which the identifier of the external battery pack and the piece of information on the battery storage apparatus are associated with each other, to the server apparatus. This configuration allows a user to obtain a record of communication of the external battery pack with the battery storage apparatus by, for example, inquiring a piece of data of the server apparatus.

According to a ninth aspect of the present disclosure, there is provided a control method for an information terminal, the control method including (a) receiving a piece of location information of a battery storage apparatus which stores a battery pack from a server apparatus, the location information indicating location of the battery storage apparatus at a time of presence of an external battery pack designated by a user of an information terminal within a communication range for near field communication of the battery storage apparatus and (b) displaying the received piece of location information of the battery storage apparatus on a display of the information terminal.

This configuration allows a user to check, on a display screen of the information terminal, a piece of location information of the battery storage apparatus at a time of near field communication of the designated external battery pack with the battery storage apparatus.

A control method for an information terminal according to a tenth aspect of the present disclosure is the control method for the information terminal according to the ninth aspect, in which the receiving (a) may include receiving a piece of date and time information on a date and time of presence of the external battery pack designated by the user of the information terminal within the communication range for near field communication of the battery storage apparatus in addition to the piece of location information of the battery storage apparatus, and the displaying (b) may include displaying the piece of location information of the battery storage apparatus and the piece of date and time information on the date and time of presence of the external battery pack within the communication range for near field communication of the battery storage apparatus.

This configuration allows a user to check, on a display screen of the information terminal, a piece of location information of the battery storage apparatus at a time of near field communication of the designated external battery pack with the battery storage apparatus and a piece of date and time information on a date and time of near field communication.

A control method for an information terminal according to an 11th aspect of the present disclosure is the control method for the information terminal according to the ninth aspect, in which the displaying (b) may include displaying, as a history, a piece of data, in which the piece of location information of the battery storage apparatus and a piece of date and time information on a date and time of presence within the communication range for near field communication of the battery storage apparatus are associated with each other, on a basis of the piece of date and time information.

This configuration allows a user to check, on a display screen of the information terminal, a history composed of a piece of location information of the battery storage apparatus at a time of past near field communication of the designated external battery pack and a piece of date and time information on a date and time of near field communication.

A control method for an information terminal according to a 12th aspect of the present disclosure is the control method for the information terminal according to any one of the ninth to 11th aspects that may further include (c) receiving a piece of information indicating that the external battery pack has an abnormality, in which the receiving (a) may be executed upon receipt of a request for execution of the receiving (a) from the user after the receiving (c).

For example, if notification of a piece of information indicating that the external battery pack has an abnormality is given to the information terminal, and the user makes a request for execution of the receiving (a) on a basis of the notification, the receiving (a) can be executed.

A control method for an information terminal according to a 13th aspect of the present disclosure is the control method for the information terminal according to any one of the ninth to 11th aspects that may further include (c) receiving a piece of information indicating that the external battery pack has an abnormality, in which the displaying (b) may be executed upon receipt of a request for execution of the displaying (b) from the user after the receiving (a) and the receiving (c).

For example, if the user makes a request for execution of the displaying (b) on a basis of the notification when notification of a piece of information indicating that the external battery pack has an abnormality is given to the information terminal, and a piece of information on the battery storage apparatus is simultaneously received, the displaying (b) can be executed. This configuration allows the user to check, on a display screen of the information terminal, a piece of location information of the battery storage apparatus at a time of near field communication of the external battery pack with the battery storage apparatus.

A control method for an information terminal according to a 14th aspect of the present disclosure is the control method for the information terminal according to any one of the ninth to 13th aspects that may further include (c) receiving a piece of abnormality information indicating that the external battery pack has an abnormality and (d) displaying the piece of abnormality information on the display.

This configuration allows a user to check, on a display screen of the information terminal, a piece of abnormality information.

A control method for an information terminal according to a 15th aspect of the present disclosure is the control method for the information terminal according to any one of the 12th to 14th aspects, in which the piece of abnormality information may include a piece of information indicating that the external battery pack is stolen.

This configuration allows a user to check, on a display screen of the information terminal, that an external battery pack is stolen.

A battery storage apparatus according to one aspect of the present disclosure will be specifically described below with reference to the drawings.

Note that the embodiments described below are all specific examples of the present disclosure. Numerical values, shapes, materials, constituent elements, arrangement locations and connection forms of the constituent elements, steps, the order of the steps, and the like illustrated in the embodiments below are merely illustrative, and are not intended to limit the present disclosure. Among the constituent elements in the embodiments below, those not described in an independent claim representing a top-level concept will be described as optional constituent elements.

First Embodiment

A first embodiment will be described below with reference to FIGS. 1 to 14.

1-1. Configuration

An overview of the configuration of a management system which includes a battery storage apparatus according to the first embodiment of the present disclosure and manages a piece of location information of a battery pack will be described first with reference to FIGS. 1 and 2.

FIG. 1 is a schematic diagram showing the configuration of the management system including the battery storage apparatus according to the first embodiment. FIG. 2 is a block diagram showing the configuration of the management system according to the first embodiment.

Figure 2:
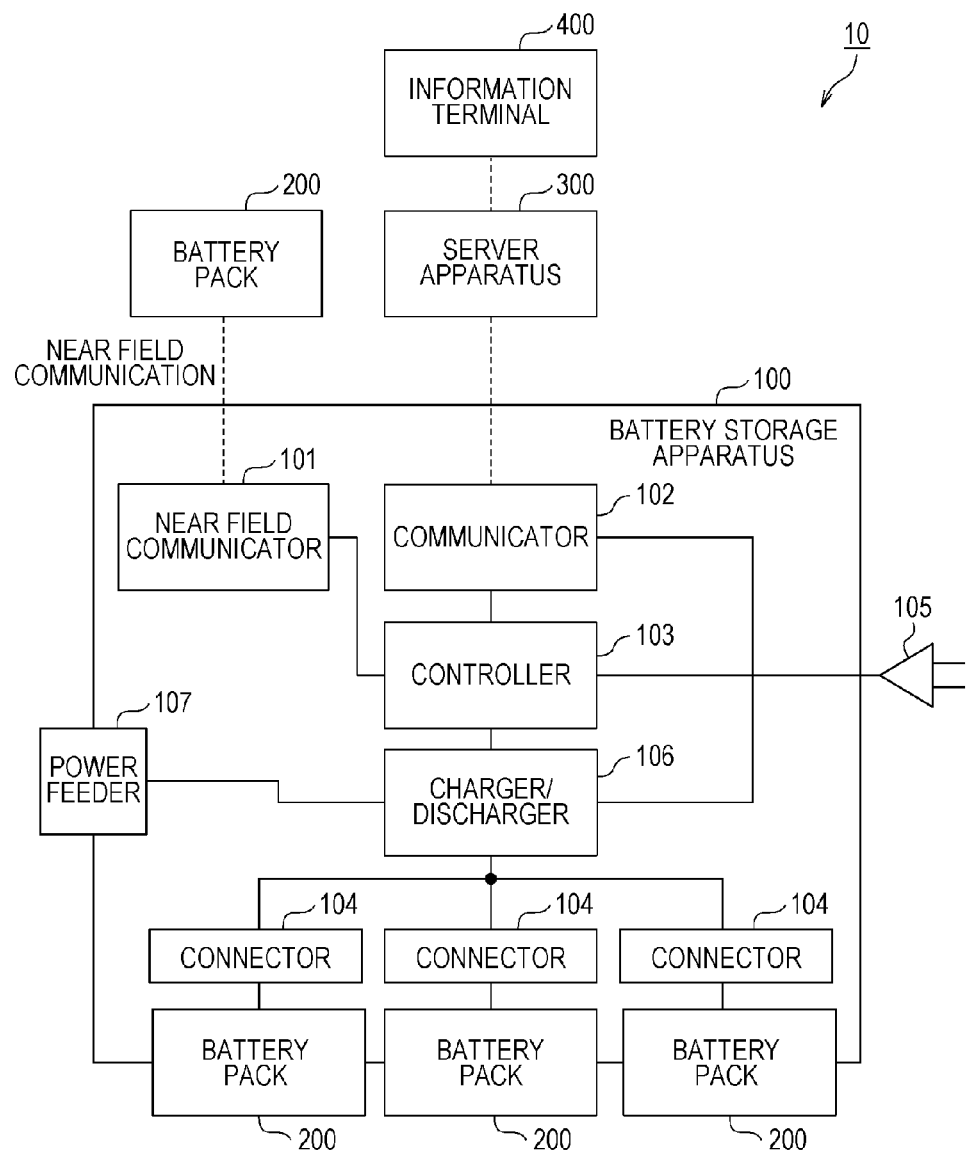
FIG. 2 is a block diagram showing the configuration of the management system according to the first embodiment.

As shown in FIGS. 1 and 2, a management system 10 according to the first embodiment includes a battery storage apparatus 100, an external battery pack 200, and a server apparatus 300. Communication based on near field communication is performed between the battery storage apparatus 100 and the external battery pack 200. Communication is performed between the battery storage apparatus 100 and the server apparatus 300 over the Internet.

[1-1-1. Battery Storage Apparatus]

As shown in FIG. 1, the battery storage apparatus 100 includes a plurality of battery packs 200, aside from the external battery pack. The battery storage apparatus 100 is electrically connected to the plurality of battery packs 200 so as to charge or discharge the plurality of battery packs 200. Note that the battery storage apparatus 100 may be a fixed apparatus or a movable body. Although the plurality of battery packs 200 of the battery storage apparatus 100 is identical in type to the external battery pack 200 in the present embodiment, the plurality of battery packs 200 may be of a different type.

More specifically, the battery storage apparatus 100 includes a near field communicator 101, a communicator 102, and a controller 103, as shown in FIG. 2. The battery storage apparatus 100 may further include a plurality of connectors 104, a power receiver 105, a charger/discharger 106, and a power feeder 107.

The near field communicator 101 performs near field communication with an external communicator 204 which is provided in the external battery pack 200. More specifically, the near field communicator 101 is implemented by a communication module which is capable of wireless communication based on a communication scheme, such as Bluetooth®, ZigBee®, or Wi-Fi®. That is, near field communication to be performed between the battery storage apparatus 100 and the battery pack 200 is based on Bluetooth®, ZigBee®, Wi-Fi®, or the like and is wireless communication, a communication distance of which is within a range of several meters to tens of meters.

The communicator 102 communicates with the server apparatus 300. More specifically, the communicator 102 connects to the Internet by means of wireless communication and communicates with the server apparatus 300. If the communicator 102 performs wireless communication, the wireless communication may be wider in communication range than wireless communication to be performed by the near field communicator 101 (to be described later). An example of such wireless communication is based on LTE®.

Note that the communicator 102 may connect to the Internet through wired communication and communicate with the server apparatus 300. The communicator 102 is, for example, a communication module which communicates with the server apparatus 300 over the Internet.

The controller 103 receives an identifier for identification of the external battery pack 200 via the near field communicator 101 if the external battery pack 200 is present within the communication range of the near field communicator 101. After that, the controller 103 outputs a piece of association data, in which the received identifier and a piece of information (hereinafter referred to as a piece of apparatus information) on the battery storage apparatus 100 are associated with each other, to the server apparatus 300 via the communicator 102.

More specifically, the controller 103 judges whether the external battery pack 200 is present within the communication range of the near field communicator 101. If the external battery pack 200 is judged to be present within the communication range, the controller 103 transmits a request for reception for receiving a piece of information including the identifier of the external battery pack 200 to the battery pack 200 via the near field communicator 101. After that, the controller 103 receives a piece of information, such as the identifier, transmitted from the external battery pack 200 in response to the request for reception of the piece of information via the near field communicator 101 and transmits a piece of data, in which the received piece of information and the piece of apparatus information on the battery storage apparatus 100 provided with the controller 103 are associated with each other, to the server apparatus 300 via the communicator 102. The piece of apparatus information here includes a piece of information for identifying a piece of location information of the battery storage apparatus 100. The piece of information for identifying the piece of location information of the battery storage apparatus 100 may be a piece of information for direct identification of the piece of location information of the battery storage apparatus 100 or a piece of information for indirect identification. For example, the piece of information for direct identification of the piece of location information of the battery storage apparatus 100 is the piece of location information of the battery storage apparatus 100. An example of the piece of location information of the battery storage apparatus 100 is a piece of location information, such as an address, a piece of latitude and longitude information, a piece of GPS information, or the like of the battery storage apparatus 100. An example of the piece of information for indirect identification of the piece of location information of the battery storage apparatus 100 is an identifier of the battery storage apparatus 100. The piece of location information of the battery storage apparatus 100 can be identified from the identifier of the battery storage apparatus 100 and a piece of data, in which the identifier of the battery storage apparatus 100 and the piece of location information are associated with each other.

If the external battery pack 200 is judged not to be present within the communication range, the controller 103 does not transmit a request for reception. Note that transmission of an identifier and a piece of apparatus information associated with each other subsumes transmission of an identifier and a piece of apparatus information at the same time.

Note that the controller 103 need not judge whether the external battery pack 200 is present within the communication range of the near field communicator 101 and may receive the identifier for identification of the external battery pack 200 via the near field communicator 101 when near field connection with the external battery pack 200 is established. Thus, the controller 103 does nothing when near field connection with the external battery pack 200 is not established.

At the time of outputting a piece of data to the server apparatus 300, the controller 103 may output a piece of data, in which a received identifier, a piece of date and time information on a date and time of reception of the identifier, and the piece of apparatus information are associated with one another, as a piece of association data to the server apparatus 300 via the communicator 102. That is, the piece of association data may be a piece of data, in which the piece of date and time information on the date and time of reception of the identifier is associated with the identifier and the piece of apparatus information.

If the controller 103 receives a piece of abnormality information indicating that the external battery pack 200 has an abnormality via the near field communicator 101 in addition to the identifier for identification of the external battery pack 200 when the external battery pack 200 is present within the communication range of the near field communicator 101, the controller 103 may output a piece of association data and the received piece of abnormality information to the server apparatus 300 via the communicator 102.

Note that the controller 103 only needs to have a control function and includes an arithmetic processing section (not shown) and a storage section (not shown) which stores a control program. Examples of the arithmetic processing section include an MPU and a CPU. An example of the storage section is a memory. The controller 103 may be composed of a single controller which performs centralized control or may be composed of a plurality of controllers which perform decentralized control in cooperation with one another.

The plurality of connectors 104 are electrically connected to the plurality of battery packs 200, respectively. More specifically, the plurality of connectors 104 have terminals which are electrically connected to terminals provided at connectors 202 (see below) of the plurality of battery packs 200, and feed power fed from the charger/discharger 106 (to be described later) to the terminals and feed power fed from the plurality of battery packs 200 to the charger/discharger 106 through the terminals. That is, the plurality of connectors 104 are electrically detachably connected to the terminals of the connectors 202 of the plurality of battery packs 200. The plurality of connectors 104 may be mechanically detachably connected to the connectors 202 of the plurality of battery packs 200.

The power receiver 105 is connected to an external power source (not shown) to receive power for charging the battery pack 200 from the external power source. The power receiver 105 is, for example, a power plug to be electrically connected to the external power source, such as a commercial power source, and receives power fed from a commercial power source as power for charging the battery pack 200. Note that the external power source is not limited to a commercial power source and may be, for example, a power source made up of a solar panel, a wind power generator, a power generator using a motor, a fuel cell, a battery, or the like.

The charger/discharger 106 is a charger which charges the battery pack 200 using power from the external power source. The charger/discharger 106 is also a discharger which discharges power from the battery pack 200. Note that the charger/discharger 106 may be composed of a charger and a discharger which are separate from and independent of each other.

More specifically, the charger/discharger 106 converts power received by the power receiver 105 into power for charging the plurality of battery packs 200. For example, the charger/discharger 106 converts AC power into DC power at a voltage appropriate for charging. The charger/discharger 106 includes a charging circuit which outputs power after conversion to the plurality of battery packs 200 electrically connected to the plurality of connectors 104.

The charger/discharger 106 converts power from the plurality of battery packs 200 electrically connected to the plurality of connectors 104 into power to be fed to the power feeder 107 (to be described later). For example, the charger/discharger 106 converts the power into DC power at an appropriate voltage or AC power at an appropriate frequency and an appropriate voltage. The charger/discharger 106 includes a discharging circuit which outputs power after conversion to the power feeder 107.

The charger/discharger 106 is implemented by, for example, an AC/DC converter and a DC/AC inverter.

The power feeder 107 is connected to an external electrical instrument (not shown) to feed power from the plurality of battery packs 200 to the external electrical instrument via the charger/discharger 106. More specifically, the power feeder 107 is an outlet which outputs 100-V AC power in the present embodiment. Note that the power feeder 107 is not limited to the outlet and may be a universal serial bus (USB) terminal which outputs 5-V DC power or a feeder coil for wireless power feeding based on, for example, Qi®.

[1-1-2. Battery Pack]

The configuration of the battery pack 200 will be described with reference to FIG. 3.

Figure 3:
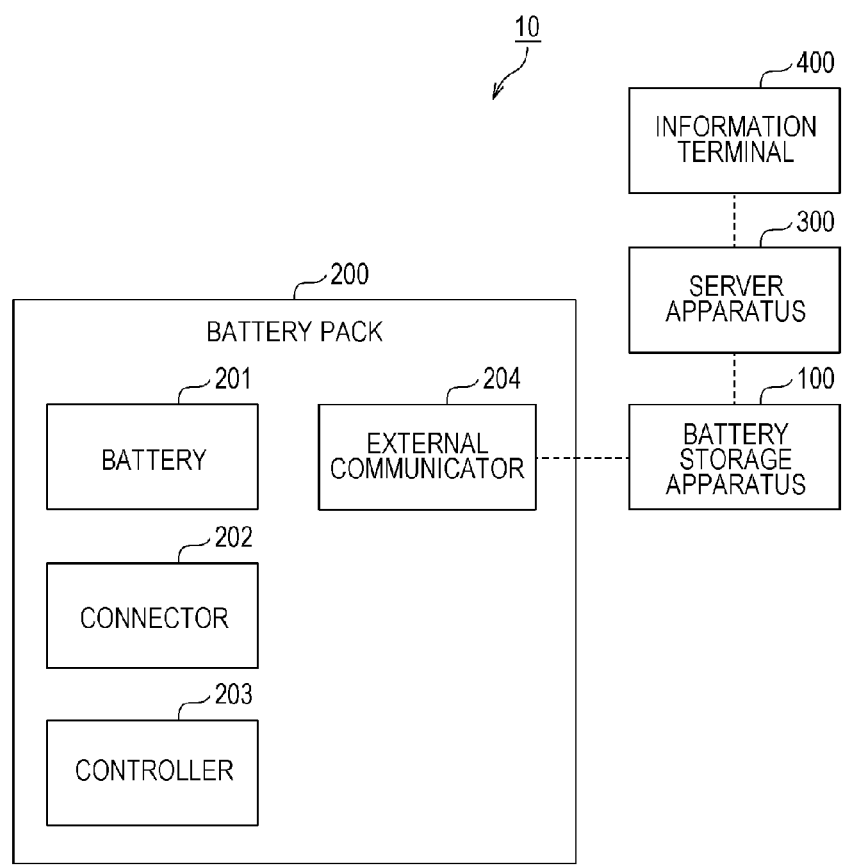
FIG. 3 is a block diagram showing the configuration of a battery pack according to the first embodiment.

FIG. 3 is a block diagram showing the configuration of the battery pack according to the first embodiment.

The battery pack 200 includes a battery 201, the connector 202, a controller 203, and the external communicator 204.

The battery 201 is composed of a plurality of cells connected in parallel or in series. The plurality of cells are, for example, lithium ion secondary batteries.

The connector 202 is capable of being detachably electrically connected to a plurality of types of electrical instruments different from one another. The connector 202 may be capable of being detachably mechanically connected to a plurality of types of electrical instruments different from one another.

The controller 203 controls discharge from the battery 201 to an electrical instrument connected to the connector 202 via the connector 202 and charge from a charging apparatus as one of a plurality of types of electrical instruments to the battery 201 via the connector 202.

The controller 203 may judge whether the battery pack 200 has an abnormality. If the controller 203 judges that the battery pack 200 has an abnormality, the controller 203 transmits a piece of abnormality information indicating that the battery pack 200 has an abnormality via the external communicator 204. If the controller 203 judges that the battery pack 200 has been stolen, the controller 203 may judge that the battery pack 200 has an abnormality. That is, a piece of abnormality information may include a piece of information indicating that the battery pack 200 has been stolen.

More specifically, at the time of the judgment as to whether the battery pack 200 has been stolen, the controller 203 performs user authentication and makes a judgment as to whether the battery pack 200 has been moved. The controller 203 judges whether the battery pack 200 has been stolen, using a result of the user authentication and a result of the movement judgment. For example, the controller 203 authenticates a user using the battery pack 200 by acquiring a piece of information on the user from an information terminal (not shown), such as a smartphone, via the external communicator 204 (to be described later) or a different communicator (not shown). For example, the controller 203 may judge that the battery pack 200 has been moved, on the basis of time intervals between previous near field communications of the battery pack 200 with a plurality of different battery storage apparatuses 100, or may judge that the battery pack 200 has been moved, on the basis of a value detected by an acceleration sensor if the battery pack 200 includes the acceleration sensor.

As described above, the controller 203 judges that the battery pack 200 has been stolen if it is detected that the battery pack 200 has been moved without user authentication. The controller 203 causes the external communicator 204 to transmit a piece of abnormality information indicating that the battery pack 200 has an abnormality together with an identifier of the battery pack 200. The controller 203 judges that the battery pack 200 has no abnormality if a result of authentication shows that a user using the battery pack 200 is an authorized user.

Note that the controller 203 only needs to have a control function and includes an arithmetic processing section (not shown) and a storage section (not shown) which stores a control program. Examples of the arithmetic processing section include an MPU and a CPU. An example of the storage section is a memory. The controller 203 may be composed of a single controller which performs centralized control or may be composed of a plurality of controllers which perform decentralized control in cooperation with one another.

The external communicator 204 is capable of the above-described near field communication with the near field communicator 101 of the battery storage apparatus 100. More specifically, if the external communicator 204 receives a request for reception of a piece of information including an identifier from the battery storage apparatus 100 when the external communicator 204 is present within the communication range of the near field communicator 101 of the battery storage apparatus 100, and wireless connection with the near field communicator 101 is established, the external communicator 204 transmits an identifier of the battery pack 200 to the near field communicator 101. If the battery pack 200 has an abnormality, the external communicator 204 tries to transmit a piece of information to the effect that the battery pack 200 has an abnormality together with the identifier of the battery pack 200. When wireless connection with the nearby battery storage apparatus 100 is established, and a request for reception of a piece of information is received from the battery storage apparatus 100, the external communicator 204 transmits the piece of information and the identifier to the battery storage apparatus 100.

[1-1-3. Server Apparatus]

The configuration of the server apparatus 300 will be described with reference to FIG. 4.

Figure 4:
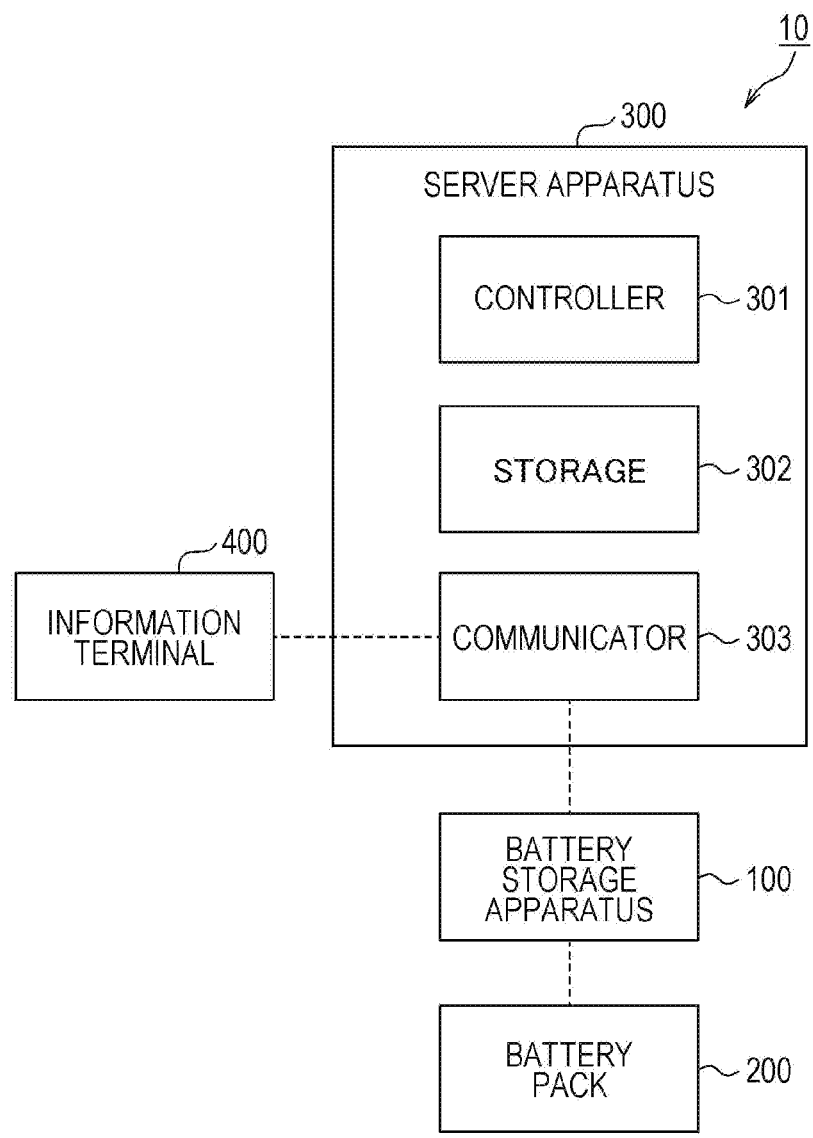
FIG. 4 is a block diagram showing the configuration of a server apparatus according to the first embodiment.

FIG. 4 is a block diagram showing the configuration of the server apparatus according to the first embodiment.

The server apparatus 300 includes a controller 301, a storage 302, and a communicator 303.

The controller 301 accumulates a piece of association data received from the battery storage apparatus 100 via the communicator 303 in the storage 302. That is, the controller 301 causes the storage 302 to store a plurality of pieces of association data received at different times from the battery storage apparatus 100 by the communicator 303 (see FIG. 11).

Upon receipt of a predetermined piece of association data, the controller 301 gives notification of a piece of recognition information recognized in relation to the battery pack 200 to a user of the battery pack 200 on the basis of the received piece of association data. The battery pack 200 is the battery pack 200 having an identifier in the received piece of association data. The piece of recognition information is a piece of location information on a location of recognition of the presence of the battery pack 200. More specifically, the piece of recognition information corresponds to a piece of location information of the battery storage apparatus 100 at the time of presence of the battery pack 200 within the communication range of the battery storage apparatus 100. The piece of location information of the battery storage apparatus 100 is obtained from a piece of information for identifying the piece of location information of the battery storage apparatus 100 which is included in a piece of apparatus information. The user is given notification of the piece of recognition information by, for example, giving notification of the piece of recognition information to an information terminal used by the user via the communicator 303. More specifically, notification is given to, for example, an address of the user associated with the battery pack 200 via the communicator 303. Note that the address of the user associated with the battery pack 200 is, for example, an address in a service, to which the user subscribes, an e-mail address of the user, or the like.

More specifically, when the controller 301 receives a request for reception of a piece of recognition information related to the predetermined battery pack 200 from an information terminal 400 used by a user, the controller 301 may transmit a piece of recognition information related to the predetermined battery pack 200 to the information terminal 400 via the communicator 303. Each time the controller 301 receives a predetermined piece of association data from the battery storage apparatus 100, the controller 301 may give notification of a piece of recognition information related to the battery pack 200 to an information terminal of a user using the battery pack 200 having an identifier in the piece of association data via the communicator 303.

Note that the controller 301 only needs to have a control function and includes an arithmetic processing section (not shown) and a storage section (not shown) which stores a control program. Examples of the arithmetic processing section include an MPU and a CPU. An example of the storage section is a memory. The controller 301 may be composed of a single controller which performs centralized control or may be composed of a plurality of controllers which perform decentralized control in cooperation with one another.

The storage 302 stores a piece of association data received from the battery storage apparatus 100. The storage 302 may store a piece of user information, in which an identifier for identification of a user, an identifier of the battery pack 200 used by the user, and an address as described above for giving notification of a piece of recognition information to an information terminal of the user are associated with one another. The storage 302 is implemented by, for example, a storage apparatus, such as a hard disk drive (HDD) or a nonvolatile memory.

The communicator 303 communicates with the battery storage apparatus 100 or the information terminal 400. The communicator 303 is, for example, a communication module which is communicatively connected to the Internet.

Note that the server apparatus 300 is not necessarily composed of a single apparatus and may be composed of a plurality of apparatuses. Alternatively, the server apparatus 300 may be at least a part of an apparatus which implements cloud computing that provides a piece of software, data, and the like through a network, such as the Internet.

[1-1-4. Information Terminal]

The configuration of the information terminal 400 will be described with reference to FIG. 5.

Figure 5:
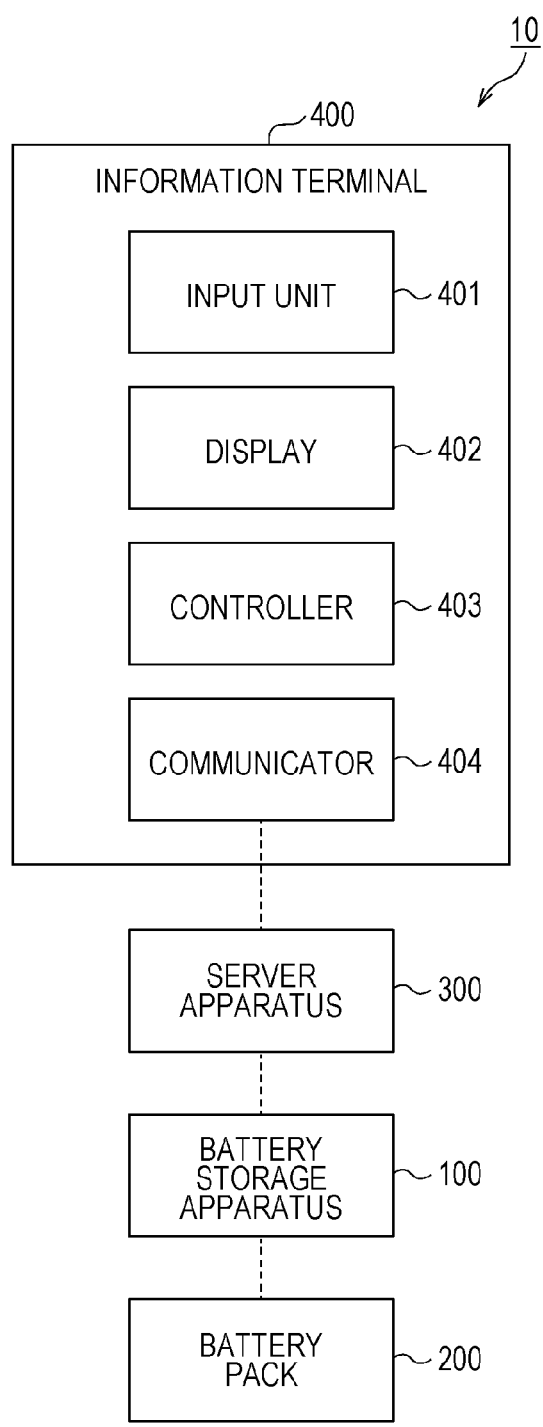
FIG. 5 is a block diagram showing the configuration of an information terminal according to the first embodiment.

FIG. 5 is a block diagram showing the configuration of the information terminal according to the first embodiment.

The information terminal 400 includes an input unit 401, a display 402, a controller 403, and a communicator 404. The information terminal 400 is implemented by a smartphone in the present embodiment. Note that the information terminal 400 may be implemented by a tablet terminal, a personal computer (PC), or the like.

The input unit 401 is an input device with which a user enters an input and generates an input signal indicating the input. The input unit 401 is implemented by, for example, a touch panel, a button, a microphone, or the like and generates an input signal indicating a touch input entered with a touch panel by the user, an input such as a gesture input, an input indicating that a button has been pressed by the user, an input based on a voice of the user, or the like.

The display 402 is a display screen which displays an image output by the controller 403. The display 402 is implemented by, for example, a liquid crystal display, an organic EL display, or the like.

The controller 403 includes a processing section which executes an application and outputs a result of the execution to the display 402. More specifically, the controller 403 receives a piece of recognition information recognized in relation to the battery pack 200 from the server apparatus 300 via the communicator 404. Each time the controller 403 receives a piece of recognition information, the controller 403 may generate an image indicating the content of the piece of recognition information and display the image on the display 402. The controller 403 may generate an image indicating a piece of recognition information related to the battery pack 200 in response to an input from a user and display the image on the display 402.

Note that the controller 403 only needs to have a control function and includes an arithmetic processing section (not shown) and a storage section (not shown) which stores a control program. Examples of the arithmetic processing section include an MPU and a CPU. An example of the storage section is a memory. The controller 403 may be composed of a single controller which performs centralized control or may be composed of a plurality of controllers which perform decentralized control in cooperation with one another.

The communicator 404 communicates with the server apparatus 300. The communicator 404 is implemented by, for example, a communication module capable of communicatively connecting to the Internet via a cellular phone communication network, Wi-Fi®, or Ethernet®.

1-2. Operation

An overview of the operation of the management system 10 with the above-described configuration will be described below with reference to FIGS. 6A, 6B, and 7.

Figure 6A:
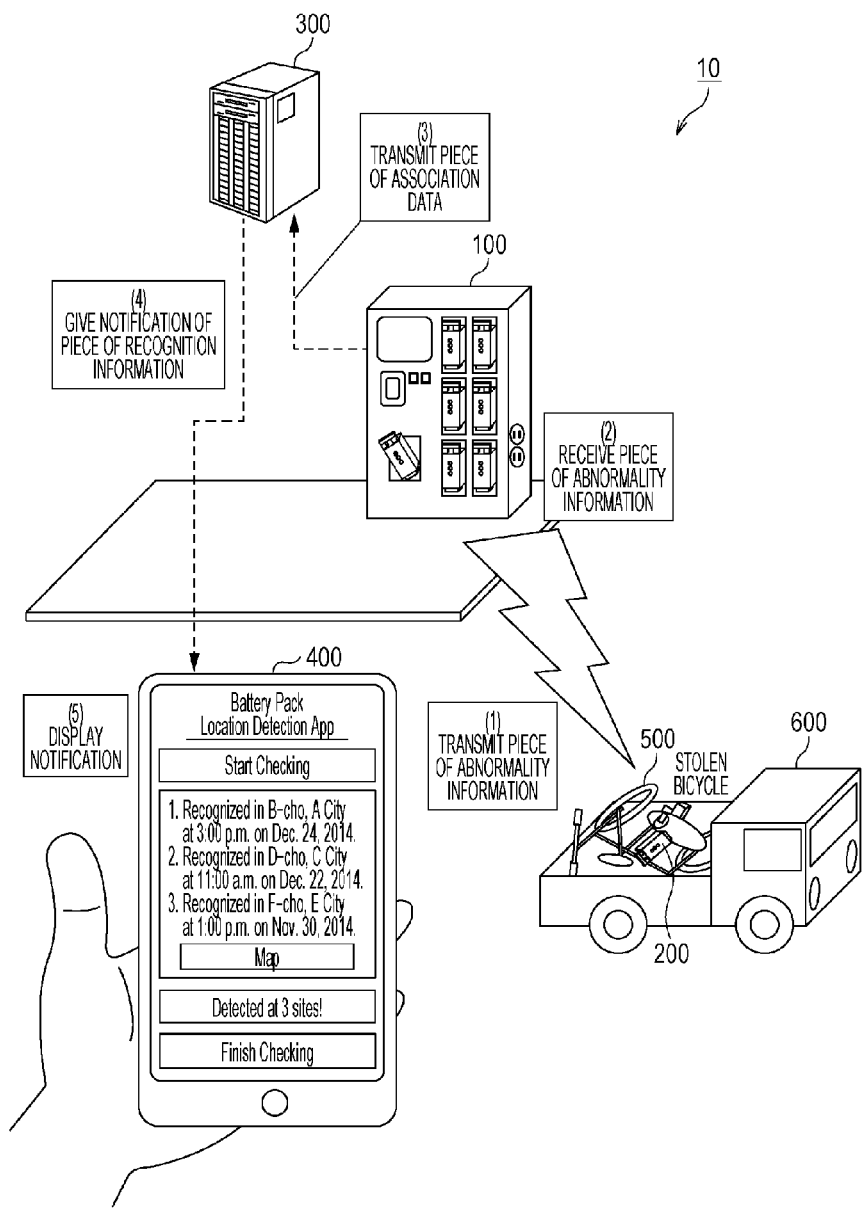
FIG. 6A is a diagram for explaining an example of the operation of the management system according to the first embodiment.

FIG. 6A is a diagram for explaining an example of the operation of the management system according to the first embodiment. More specifically, FIG. 6A is a diagram for explaining an operation to be performed in the management system 10 if a movable body 500 provided with the battery pack 200 is stolen, and the battery pack 200 has an abnormality. FIG. 7 is a diagram for explaining a flow of information to be transmitted and received in the management system according to the first embodiment.

For example, if the movable body 500, such as a bicycle, provided with the battery pack 200 is loaded on a bed of a truck 600 and is moved, as shown in FIG. 6A, the battery pack 200 judges, from a result of user authentication and a result of movement judgment, that the battery pack 200 has been stolen, as described above.

As shown in (1) of FIG. 6A, the battery pack 200 judged to be stolen tries to transmit a piece of abnormality information indicating occurrence of an abnormality to the battery storage apparatus 100 and, when the battery pack 200 is present within the communication range of the battery storage apparatus 100, transmits the piece of abnormality information to the battery storage apparatus 100. Note that the battery storage apparatus 100 is fixed indoors or outdoors.

As shown in (2) of FIG. 6A, the battery storage apparatus 100 receives the piece of abnormality information transmitted from the battery pack 200. With the operations shown in (1) and (2) of FIG. 6A, a piece of pack information including the piece of abnormality information is transmitted to the battery storage apparatus 100 through near field communication, and the battery storage apparatus 100 after reception of the piece of pack information generates a piece of association data, in which the received piece of pack information, a piece of date and time information on a date and time of reception of the piece of pack information, and a piece of location information on a location where the battery storage apparatus 100 is installed are associated with one another, as shown in FIG. 7.

Figure 7:
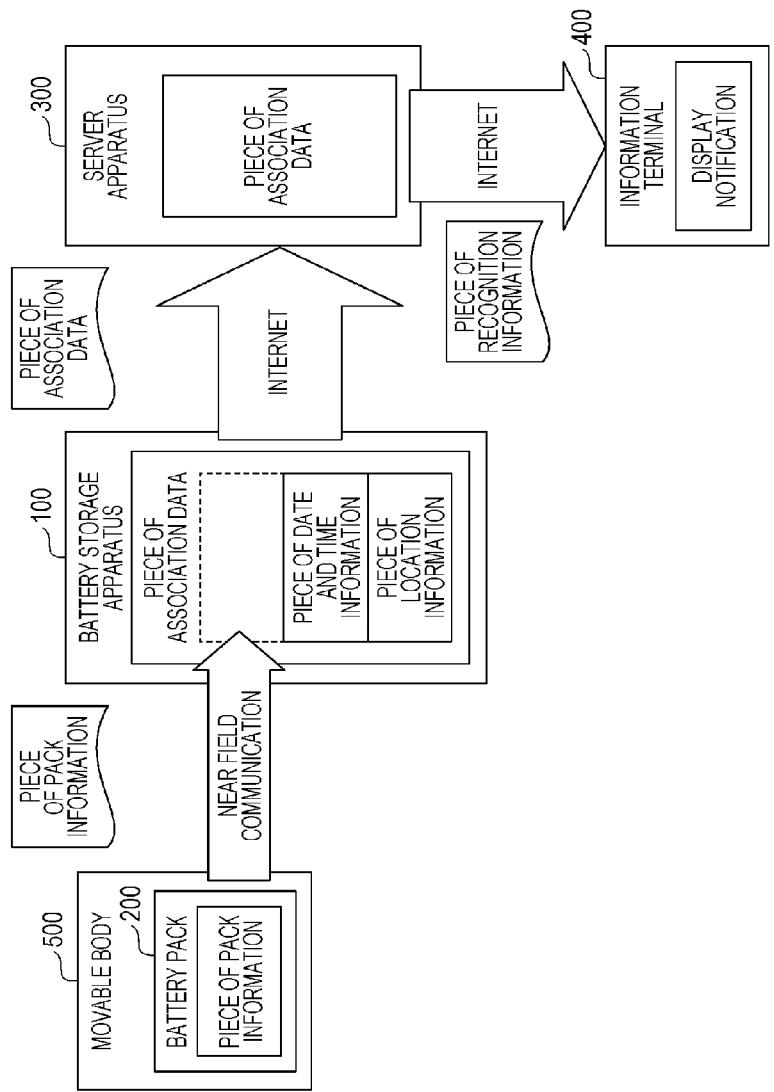
FIG. 7 is a diagram for explaining a flow of information to be transmitted and received in the management system according to the first embodiment.

As shown in (3) of FIG. 6A and in FIG. 7, the battery storage apparatus 100 transmits the generated piece of association data to the server apparatus 300 over the Internet. The server apparatus 300 receives the piece of association data.

As shown in (4) of FIG. 6A and in FIG. 7, the server apparatus 300 gives notification of a piece of recognition information recognized in relation to the battery pack 200 to an information terminal of a user using the battery pack 200 on the basis of the received piece of association data. The piece of recognition information includes a piece of location information on a location of recognition of the presence of the battery pack 200. In this example, the piece of recognition information includes the piece of location information and a piece of date and time information on a date and time of recognition of the presence of the battery pack 200. The piece of location information on the location of recognition of the presence of the battery pack 200 corresponds to the piece of location information of the battery storage apparatus 100 at a time of presence of the battery pack 200 within the communication range of the battery storage apparatus 100. The piece of date and time information on the date and time of recognition of the presence of the battery pack 200 corresponds to a piece of date and time information on a date and time of presence of the battery pack 200 within the communication range of the battery storage apparatus 100. Note that the piece of location information and the piece of date and time information are included in a piece of information recognized in relation to the presence of the battery pack 200 of the piece of recognition information recognized in relation to the battery pack 200.

Finally, as shown in (5) of FIG. 6A and in FIG. 7, the information terminal 400 after reception of the notification displays the content of the piece of recognition information, notification of which is given, on the display 402. More specifically, the information terminal 400 displays the content of the notification including the piece of location information, the piece of date and time information, and the like.

As described above, if the battery pack 200 has an abnormality, a piece of association data, in which a piece of apparatus information of the battery storage apparatus 100 and an identifier of the battery pack 200 are associated with each other, is transmitted to the server apparatus 300 when the battery pack 200 passes through the communication range for near field communication of the battery storage apparatus 100. The server apparatus 300 gives notification of a piece of abnormality information indicating that the battery pack 200 has an abnormality included in a piece of recognition information to an information terminal of a user who is registered as a user of the battery pack 200.

FIG. 6B is a diagram for explaining another example of the operation of the management system according to the first embodiment. More specifically, FIG. 6B is a diagram for explaining an operation to be performed in the management system 10 if the movable body 500 provided with the battery pack 200 is stolen, and the battery pack 200 has an abnormality.

In this example, a battery storage apparatus 100D is a movable body, such as a vehicle. More specifically, the battery storage apparatus 100D may be, for example, a vehicle which stores a rental battery pack and delivers the rental battery pack to a customer.

In this example, as shown in (1) of FIG. 6B, the battery pack 200 tries to transmit a piece of abnormality information indicating that the battery pack 200 has an abnormality to the battery storage apparatus 100D in motion. When the battery pack 200 is present within the communication range of the battery storage apparatus 100D, the battery pack 200 transmits the piece of abnormality information to the battery storage apparatus 100D.

As shown in (2) of FIG. 6B, the battery storage apparatus 100D receives the piece of abnormality information transmitted from the battery pack 200. With the operations in (1) and (2) of FIG. 6B, a piece of pack information including the piece of abnormality information is transmitted from the battery pack 200 to the battery storage apparatus 100 through near field communication, as shown in FIG. 7. The battery storage apparatus 100 after reception of the piece of pack information generates a piece of association data, in which the received piece of pack information, a piece of date and time information on a date and time of reception of the piece of pack information, and a piece of location information indicating a location of the battery storage apparatus 100 at the time of reception of the piece of pack information are associated with one another.

Operations shown in (3), (4), and (5) of FIG. 6B are the same as those shown in (3), (4), and (5) of FIG. 6A.

[1-2-1. Operation of Battery Storage Apparatus]

Individual operations of the battery storage apparatus 100, the server apparatus 300, and the information terminal 400 constituting the management system 10 will be described in order.

First, the operation of the battery storage apparatus 100 of the management system 10 will be described below with reference to FIG. 8.

Figure 8:
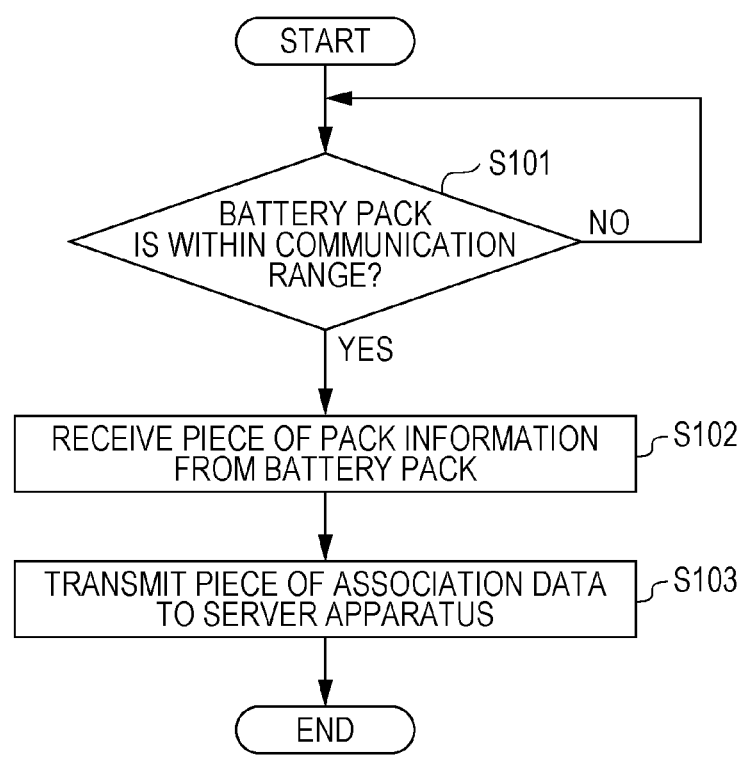
FIG. 8 is a flowchart for explaining an example of the operation of the battery storage apparatus according to the first embodiment.

FIG. 8 is a flowchart for explaining an example of the operation of the battery storage apparatus according to the first embodiment.

In the battery storage apparatus 100, the controller 103 first judges whether there is the external battery pack 200 that is present within the communication range of the near field communicator 101 (S101).

If the controller 103 judges that there is the external battery pack 200 present within the communication range of the near field communicator 101 (Yes in S101), the controller 103 receives a piece of pack information which is a piece of information including an identifier of the external battery pack 200 (S102). If the external battery pack 200 has an abnormality at this time, the controller 103 receives the piece of pack information including a piece of abnormality information from the battery pack 200. That is, if Yes in step S101, the controller 103 receives at least the identifier of the battery pack 200 among the identifier and a piece of abnormality information as the piece of pack information of the battery pack 200.

The controller 103 transmits a piece of association data, in which the received piece of pack information and a piece of apparatus information on the battery storage apparatus 100 provided with the controller 103 are associated with each other, to the server apparatus 300 via the communicator 102 (S103).

[1-2-2. Operation of Server Apparatus]

The operation of the server apparatus 300 of the management system 10 will be described with reference to FIGS. 9A to 9C.

Figure 9A:
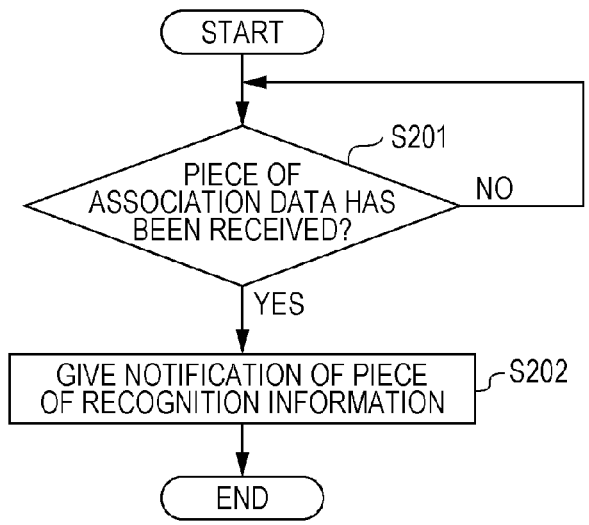
FIG. 9A is a flowchart for explaining an example of the operation of the server apparatus according to the first embodiment.

FIG. 9A is a flowchart for explaining an example of the operation of the server apparatus according to the first embodiment. FIG. 9B is a flowchart for explaining another example of the operation of the server apparatus according to the first embodiment. FIG. 9C is a flowchart for explaining another example of the operation of the server apparatus according to the first embodiment.

An example of the operation of the server apparatus 300 will be described first with reference to FIG. 9A.

In the server apparatus 300, the controller 301 judges whether the controller 301 has received a piece of association data from the battery storage apparatus 100 (S201).

If the controller 301 judges that the controller 301 has received a piece of association data from the battery storage apparatus 100 (Yes in S201), the controller 301 gives notification of a piece of recognition information recognized in relation to the battery pack 200 to an information terminal of a user of the battery pack 200 via the communicator 303 on the basis of the received piece of association data (S202). If an address in a service, to which the user subscribes, is set as an address of the user which is associated with the battery pack 200 at this time, the controller 301 gives notification of the piece of recognition information to the address in the service. More specifically, if the user has already installed an application capable of receiving notification on the information terminal 400 and subscribes to a service of the application, the controller 301 gives notification to an address of the user in the service of the application. If an e-mail address of the user is set as the address associated with the battery pack 200, the controller 301 gives notification of the piece of recognition information by transmitting e-mail including the piece of recognition information to the e-mail address. With the notification, the information terminal 400, in which the address is set, receives the piece of recognition information.

On the other hand, if the controller 301 judges that the controller 301 has not received a piece of association data from the battery storage apparatus 100 (No in S201), the controller 301 repeats step S201. That is, the controller 301 waits until a piece of association data is received from the battery storage apparatus 100.

As described above, referring to FIG. 9A, each time the server apparatus 300 receives a piece of association data, the server apparatus 300 gives push notification of a piece of recognition information recognized in relation to the battery pack 200 having an identifier in the piece of association data to an information terminal of a user of the battery pack 200.

Figure 9B:
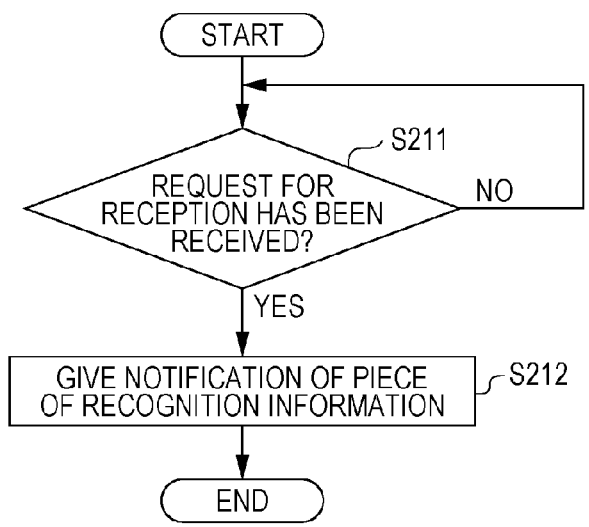
FIG. 9B is a flowchart for explaining another example of the operation of the server apparatus according to the first embodiment.

The server apparatus 300 may perform the operation below as shown in FIG. 9B. Another example of the operation of the server apparatus 300 will be described with reference to FIG. 9B.

In the server apparatus 300, the controller 301 judges whether a request for reception of a piece of recognition information has been received from the information terminal 400 (S211).

If the controller 301 judges that the controller 301 has received a request for reception of a piece of recognition information from the information terminal 400 (Yes in S211), the controller 301 identifies an identifier of the battery pack 200 used by a user of the information terminal 400 by referring to a piece of user information and gives notification of a piece of recognition information recognized in relation to the battery pack 200 having the identified identifier among pieces of association data accumulated in the storage 302 to the information terminal 400 (S212). An address of the notification is the same as that in step S202, and the information terminal 400, in which the address is set, receives the piece of recognition information.

On the other hand, if the controller 301 judges that the controller 301 has not received a request for reception of a piece of recognition information from the information terminal 400 (No in S211), the controller 301 repeats step S211. That is, the controller 301 waits until a request for reception is received from the information terminal 400.

As described above, the server apparatus 300 may give notification of a piece of recognition information upon receipt of a request for reception from the information terminal 400 of a user.

Figure 9C:
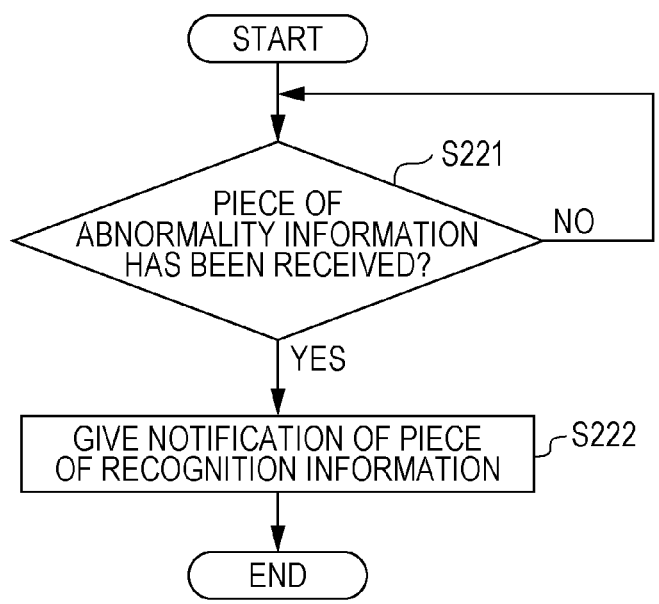
FIG. 9C is a flowchart for explaining another example of the operation of the server apparatus according to the first embodiment.

The server apparatus 300 may perform the operation below as shown in FIG. 9C. Another example of the operation of the server apparatus 300 will be described with reference to FIG. 9C.

In the server apparatus 300, the controller 301 judges whether the controller 301 has received a piece of abnormality information from the battery storage apparatus 100 (S221).

If the controller 301 judges that the controller 301 has received a piece of abnormality information from the battery storage apparatus 100 (Yes in S221), the controller 301 gives notification of a piece of recognition information including the received piece of abnormality information to an information terminal of a user of the battery pack 200 via the communicator 303 (S222). The battery pack 200 has an identifier in a piece of association data including the piece of abnormality information.

On the other hand, if the controller 301 judges that the controller 301 has not received a piece of abnormality information from the battery storage apparatus 100 (No in S221), the controller 301 repeats step S221. That is, the controller 301 waits until a piece of abnormality information is received from the battery storage apparatus 100.

As described above, the server apparatus 300 may give notification of a piece of abnormality information upon receipt of the piece of abnormality information.

The three types of operations of the server apparatus 300 illustrated in FIGS. 9A to 9C described above may be performed in parallel or at least one type of operation may be performed. Alternatively, only one selected from among the three types of operations in accordance with user settings may be performed.

[1-2-3. Operation of Information Terminal]

The operation of the information terminal 400 in the management system 10 will be described below with reference to FIGS. 10A to 10C.

Figure 10A:
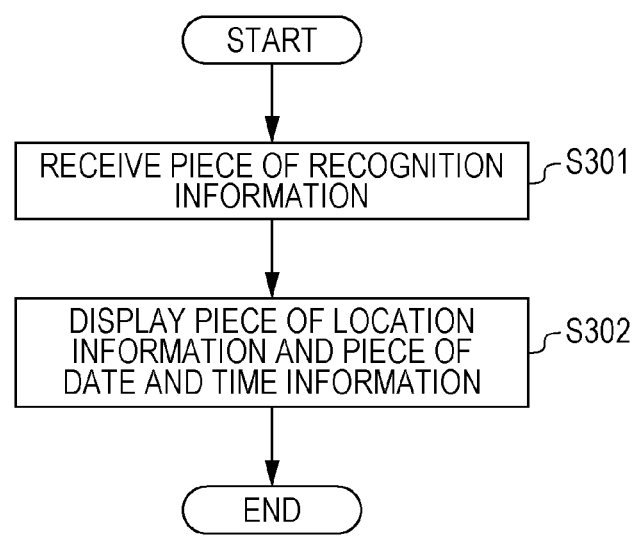
FIG. 10A is a flowchart for explaining an example of the operation of the information terminal according to the first embodiment.

FIG. 10A is a flowchart for explaining an example of the operation of the information terminal according to the first embodiment. FIG. 10B is a flowchart for explaining another example of the operation of the information terminal according to the first embodiment. FIG. 10O is a flowchart for explaining another example of the operation of the information terminal according to the first embodiment.

First, an example of the operation of the information terminal 400 will be described with reference to FIG. 10A.

In the information terminal 400, the controller 403 receives a piece of recognition information recognized in relation to the battery pack 200, notification of which is given from the server apparatus 300 (S301).

When the controller 403 receives the piece of recognition information related to the battery pack 200 from the server apparatus 300, the controller 403 displays a piece of location information and a piece of date and time information included in the piece of recognition information on the display 402 (S302).

As described above, referring to FIG. 10A, the information terminal 400 displays the content of notification on the display 402 upon receipt of the notification.

Note that the controller 403 may judge whether the controller 403 has received a piece of recognition information, notification of which is given from the server apparatus 300, and, if the controller 403 judges that the controller 403 has received a piece of recognition information, notification of which is given from the server apparatus 300, may perform step S302. In this case, the controller 403 waits until a piece of recognition information, notification of which is given from the server apparatus 300, is received.

Figure 10B:
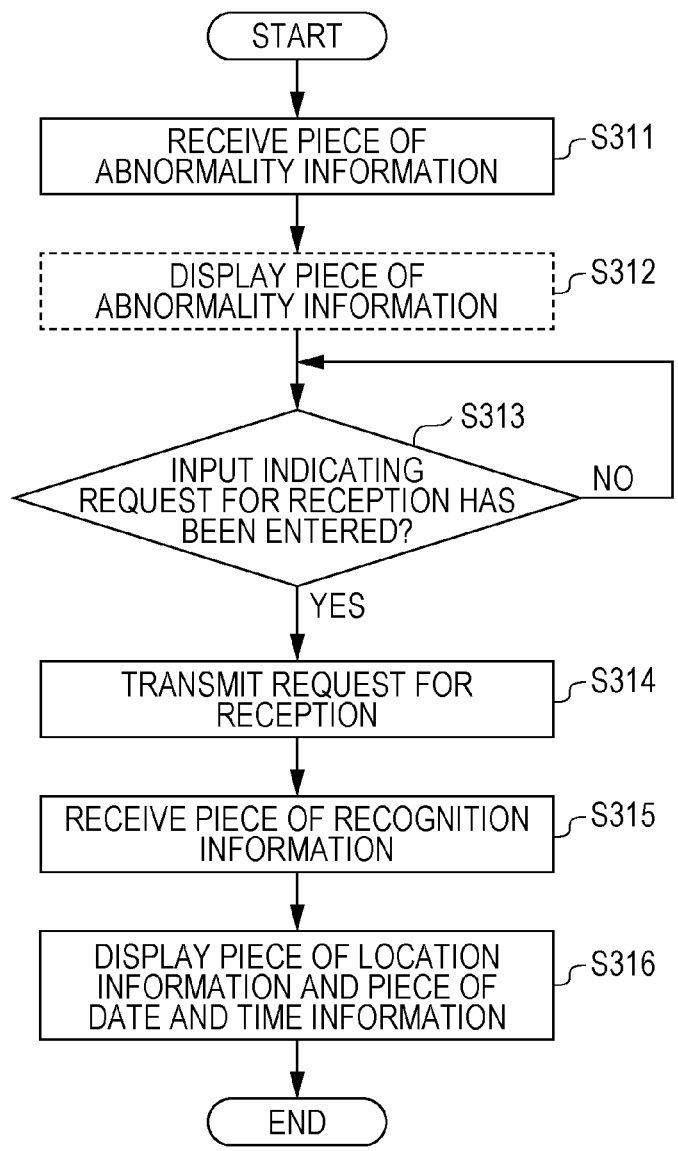
FIG. 10B is a flowchart for explaining another example of the operation of the information terminal according to the first embodiment.

The information terminal 400 may perform the operation below as shown in FIG. 10B. Another example of the operation of the information terminal 400 will be described with reference to FIG. 10B.

In the information terminal 400, the controller 403 receives a piece of abnormality information of a piece of recognition information recognized in relation to the battery pack 200 via the communicator 404 (S311).

The controller 403 displays the received piece of abnormality information on the display 402 (S312). More specifically, when the controller 403 receives the piece of abnormality information, the controller 403 displays an abnormal display indicating the piece of abnormality information on the display 402. Note that the controller 403 need not display the received piece of abnormality information on the display 402.

The controller 403 judges whether a user has entered an input indicating a request for reception of a piece of information recognized in relation to the presence of the battery pack 200 of the piece of recognition information with the input unit 401 (S313).

If the controller 403 judges that the user has entered an input indicating a request for reception of a piece of information recognized in relation to the presence of the battery pack 200 with the input unit 401 (Yes in S313), the controller 403 transmits the request for reception of the piece of recognition information to the server apparatus 300 (S314).

On the other hand, if the controller 403 judges that the user has not entered an input indicating a request for reception of the piece of recognition information with the input unit 401 (No in S313), the controller 403 repeats step S313. That is, the controller 403 waits until the user enters an input indicating a request for reception of the piece of recognition information with the input unit 401.

After step S314, the controller 403 receives a piece of information recognized in relation to the presence of the battery pack 200 as a response to the transmitted request for reception of the piece of recognition information from the server apparatus 300 via the communicator 404 (S315). The piece of information recognized in relation to the presence of the battery pack 200 includes a piece of location information on a location of recognition of the presence of the battery pack 200 and a piece of date and time information on a date and time of recognition of the presence of the battery pack 200. The piece of location information corresponds to a piece of location information of the battery storage apparatus 100 at the time of presence of the battery pack 200 within the communication range of the battery storage apparatus 100. The piece of date and time information corresponds to a piece of date and time information on a date and time of presence of the battery pack 200 within the communication range of the battery storage apparatus 100.

The controller 403 then displays the piece of location information and the piece of date and time information included in the piece of recognition information on the display 402 (S316).

As described above, when a user has entered an input indicating a request for reception of a piece of information recognized in relation to the presence of the battery pack 200 with the input unit 401, the information terminal 400 may receive a piece of recognition information by transmitting a request for reception of the piece of recognition information to the server apparatus 300 and display a piece of location information and a piece of date and time information based on the piece of recognition information on the display 402.

The information terminal 400 may perform the operation below as shown in FIG. 100. Another example of the operation of the information terminal 400 will be described with reference to FIG. 100.

In the information terminal 400, the controller 403 receives a piece of abnormality information of a piece of recognition information recognized in relation to the battery pack 200 via the communicator 404 (S321).

The controller 403 then displays the content of the received piece of abnormality information on the display 402 (S322). More specifically, when the controller 403 receives the piece of abnormality information, the controller 403 displays an abnormality display indicating the piece of abnormality information on the display 402. Note that the controller 403 need not display the received piece of abnormality information on the display 402.

The controller 403 receives a piece of information recognized in relation to the presence of the battery pack 200 of the piece of recognition information from the server apparatus 300 (S323). Note that step S321 and step S323 may be simultaneously performed. That is, the controller 403 may receive the piece of recognition information including the piece of abnormality information and the piece of information recognized in relation to the presence of the battery pack 200 via the communicator 404. The piece of information recognized in relation to the presence of the battery pack 200 includes a piece of location information on a location of recognition of the presence of the battery pack 200 and a piece of date and time information on a date and time of recognition of the presence of the battery pack 200. The piece of location information corresponds to a piece of location information of the battery storage apparatus 100 at the time of presence of the battery pack 200 within the communication range of the battery storage apparatus 100. The piece of date and time information corresponds to a piece of date and time information on a date and time of presence of the battery pack 200 within the communication range of the battery storage apparatus 100.

The controller 403 judges whether a user has entered an input indicating a request for display for displaying the received piece of information recognized in relation to the presence of the battery pack 200 on the display 402 with the input unit 401 (S324).

If the controller 403 judges that the user has entered an input indicating a request for display for displaying the received piece of recognition information on the display 402 with the input unit 401 (Yes in S324), the display 402 displays the piece of location information and the piece of date and time information included in the received piece of information on the display 402 (S325).

On the other hand, if the controller 403 judges that the user has not entered an input indicating a request for display for displaying the received piece of recognition information on the display 402 with the input unit 401 (No in S324), the controller 403 repeats step S324. That is, the controller 403 waits until the user enters an input indicating a request for display for displaying the received piece of recognition information on the display 402 with the input unit 401.

As described above, when the user enters an input indicating a request for display for displaying the received piece of recognition information on the display 402 with the input unit 401, the information terminal 400 may display the piece of location information and the piece of date and time information included in the received piece of recognition information on the display 402.

Note that if step S321 and step S323 are simultaneously performed, a request for display input in step S324 is a request for display of the piece of recognition information including the piece of abnormality information and the piece of information recognized in relation to the presence of the battery pack 200. Thus, if a request for display is entered in step S324, the piece of abnormality information, the piece of location information, and the piece of date and time information included in the piece of recognition information are displayed together on the display 402.

1-3. Specific Example

A specific example of the operation of the management system 10 described above will be described with reference to FIGS. 11 to 14.

Figure 11:
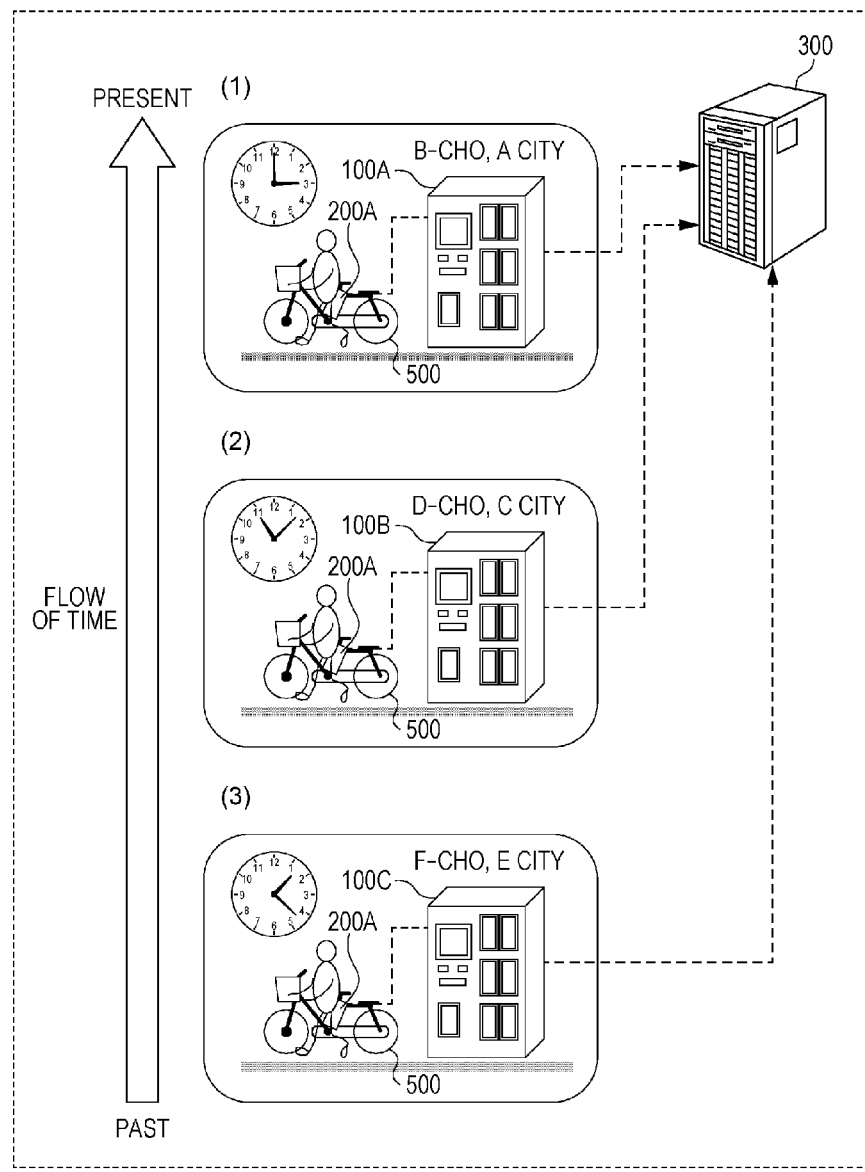
FIG. 11 is a diagram for explaining a specific example of an operation to be performed by the management system according to the first embodiment.

FIG. 11 is a diagram for explaining a specific example of an operation to be performed by the management system according to the first embodiment.

As shown in FIG. 11, a case where the movable body 500 provided with a battery pack 200A is stolen and passes through the communication ranges for near field communication of a battery storage apparatus 100C, a battery storage apparatus 100B, and a battery storage apparatus 100A, in that order, which are around the battery storage apparatuses, will be described as an example. Note that the battery pack 200A is the external battery pack 200 described above and is a battery pack with the identifier "xxxxA". The example in FIG. 11 is different from the examples in FIGS. 6A and 6B and is an example of a case where a bicycle as the movable body 500 is stolen without use of a different movable body, such as the truck 600.

A specific operation of the management system will be described with reference to FIG. 12.

Figure 12:
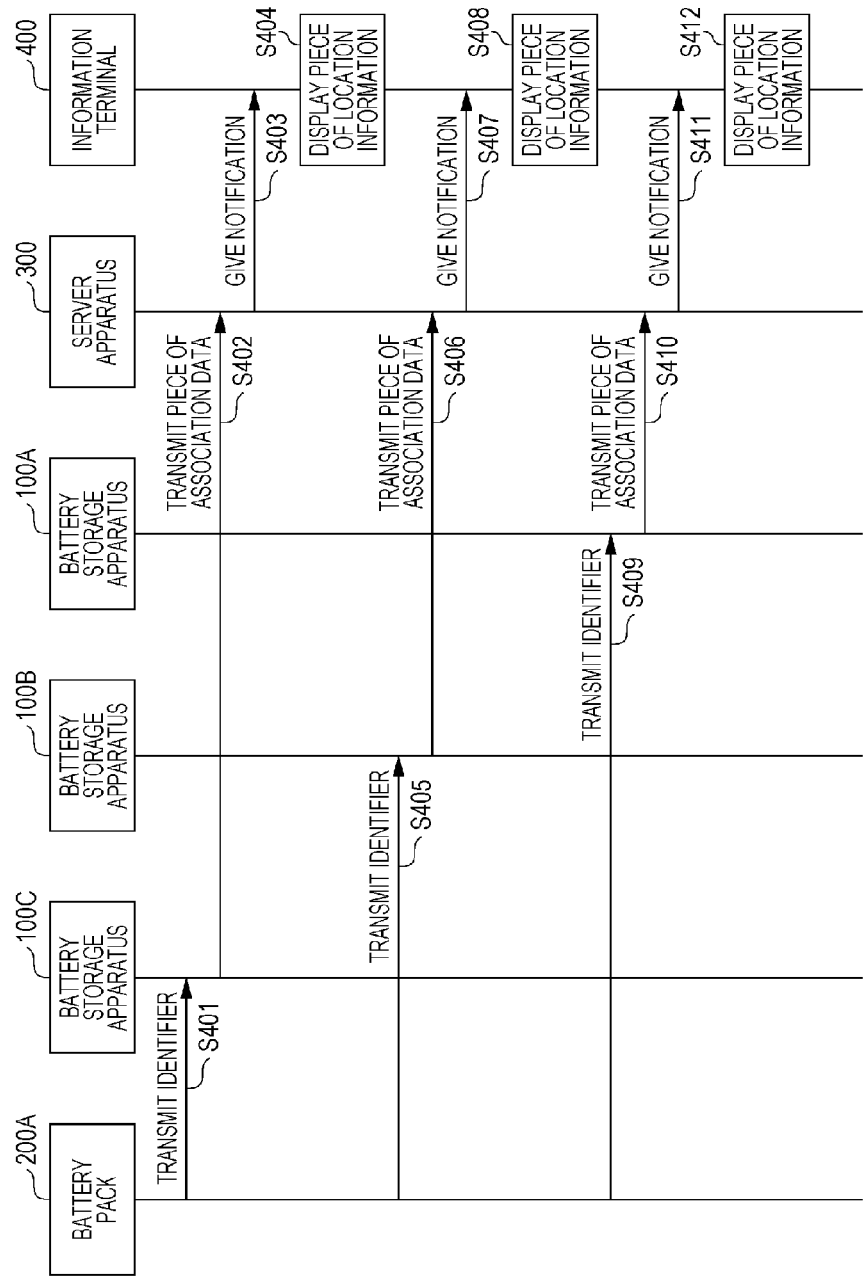
FIG. 12 is a sequence diagram showing an example of a specific operation of the management system according to the first embodiment.

FIG. 12 is a sequence diagram showing an example of a specific operation of the management system according to the first embodiment.

If the battery pack 200A passes through the communication range for near field communication of the battery storage apparatus 100C, as shown in FIG. 12, wireless connection with the battery storage apparatus 100C is established, and the identifier "xxxxA" of the battery pack 200A is transmitted to the battery storage apparatus 100A (S401).

The battery storage apparatus 100C after reception of the identifier "xxxxA" from the battery pack 200A generates a piece of association data, in which the identifier, a piece of date and time information indicating a date and time of reception of the identifier, and a piece of location information indicating a location where the battery storage apparatus 100C is installed are associated with one another, and transmits the generated piece of association data to the server apparatus 300 (S402).

The server apparatus 300 after reception of the piece of association data from the battery storage apparatus 100C gives notification of a piece of recognition information recognized in relation to the battery pack 200A to a user of the battery pack 200A on the basis of the received piece of association data (S403). More specifically, the server apparatus 300 gives notification of a piece of location information and a piece of date and time information to the information terminal 400 used by the user. The piece of location information is a piece of location information on a location of recognition of the presence of the battery pack 200A and corresponds to a piece of location information of the battery storage apparatus 100C at the time of presence of the battery pack 200A within the communication range of the battery storage apparatus 100C. The piece of date and time information is a piece of date and time information on a date and time of recognition of the presence of the battery pack 200A and corresponds to a piece of date and time information on a date and time of presence of the battery pack 200A within the communication range of the battery storage apparatus 100C.

As described above, it can be said that, with performance of steps S401 to S403, the process of receiving a piece of recognition information related to the battery pack 200A is performed in the information terminal 400 if the external battery pack 200A designated by the user of the information terminal 400 is present within the communication range for near field communication of the battery storage apparatus 100C.

The information terminal 400 displays the piece of location information on the location of recognition of the presence of the battery pack 200A on the display 402 on the basis of the received piece of recognition information (S404). At this time, the information terminal 400 may display the piece of date and time information on the date and time of recognition of the presence of the battery pack 200A on the display 402 together with the piece of location information on the location of recognition of the presence of the battery pack 200A, on the basis of the received piece of recognition information.

When the battery pack 200A passes through the communication range for near field communication of the battery storage apparatus 100B, the battery pack 200A, the battery storage apparatus 100B, and the server apparatus 300 perform processes in steps S405 to S408 in the same manner as that for steps S401 to S404 performed when the battery pack 200A passes through the communication range for near field communication of the battery storage apparatus 100C.

When the battery pack 200A passes through the communication range for near field communication of the battery storage apparatus 100A, the battery pack 200A, the battery storage apparatus 100A, and the server apparatus 300 perform processes in steps S409 to S412 in the same manner as that for steps S401 to S404 performed when the battery pack 200A passes through the communication range for near field communication of the battery storage apparatus 100C. That is, the operations described with reference to (1) to (5) in FIGS. 6A and 6B are performed for each of the battery storage apparatuses 100A to 100C.

The processes in steps S401 to S412 are performed in the above-described manner. In the server apparatus 300, after the processes in steps S402, S406, and S410, a table as shown in FIG. 13 is generated. Note that FIG. 13 is a chart showing an example of a table which is a plurality of pieces of association data accumulated in the server apparatus according to the first embodiment.

Note that, in the table shown in FIG. 13, pieces of association data for a battery pack 200B with the identifier "xxxxB" are recorded, in addition to pieces of association data for the battery pack 200A with the identifier "xxxxA". As shown in FIG. 13, the server apparatus 300 has an accumulation of a plurality of pieces of association data. That is, one piece of association data is a piece of data generated when the battery storage apparatus 100 receives an identifier once from the battery pack 200, and the identifier is associated with a piece of date and time information and a piece of location information. In the table, presence or absence of an abnormality is also associated. That is, the battery storage apparatus 100 generates a piece of association data with "Present" in the abnormality presence field if a piece of pack information including a piece of abnormality information is received from the battery pack 200 and generates a piece of association data with "Absent" in the abnormality presence field if a piece of pack information without a piece of abnormality information is received. That is, the table shown in FIG. 13 indicates that the battery pack 200A with the identifier "xxxxA" has an abnormality.

A screen to be displayed on the information terminal 400 will be described with reference to FIG. 14.

Figure 14:
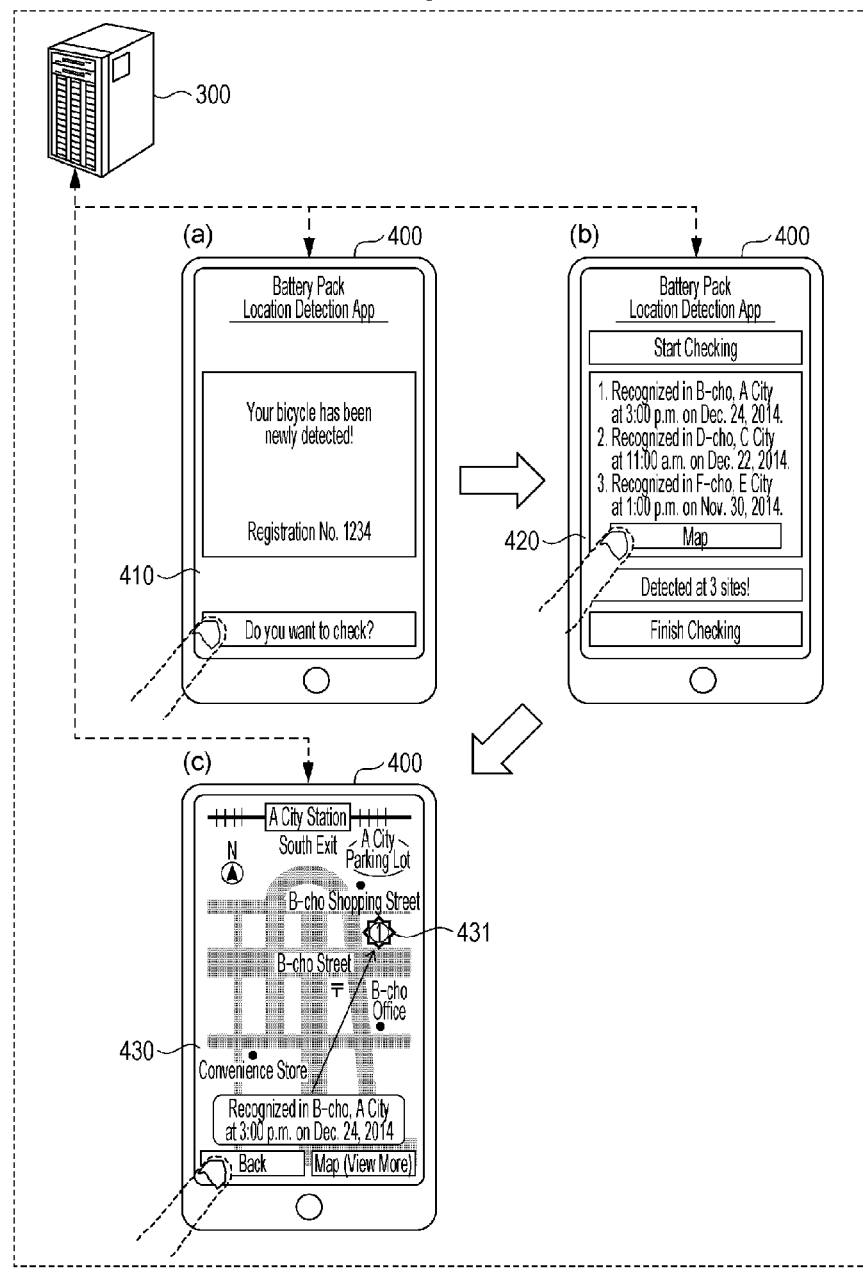
FIG. 14 is a view showing an example of a display screen to be displayed on the information terminal when the operation of the management system according to the first embodiment is performed.

FIG. 14 is a view showing an example of a screen to be displayed on the information terminal when the operation of the management system according to the first embodiment is performed.

For example, when the information terminal 400 receives notification (that is, in step S403, step S407, and step S411), the information terminal 400 may display a screen 410 indicating that a bicycle, to which the battery pack 200A is connected, has been detected, as shown in (a) of FIG. 14.

When the information terminal 400 accepts an instruction to display a piece of information recognized in relation to the presence of the bicycle (the battery pack 200A) from a user on the screen 410 after that (see a tap with a finger shown in (a) of FIG. 14), the information terminal 400 may display a screen 420 indicating a piece of location information on a location of previous recognition of the presence of the bicycle (the battery pack 200A) and a piece of date and time information on a date and time of previous recognition of the presence of the bicycle (the battery pack 200A), as shown in (b) of FIG. 14. At this time, the information terminal 400 may display a history of pieces of data, in each of which a piece of location information and a piece of date and time information are associated with each other, among pieces of recognition information related to the bicycle (the battery pack 200A), notification of which is given by the server apparatus 300 on the basis of pieces of association data transmitted from the battery storage apparatuses 100A to 100C in the past. Note that although the server apparatus 300 gives notification of a piece of recognition information as described above in this example each time the server apparatus 300 receives a piece of association data from the battery storage apparatuses 100A to 100C, the present disclosure is not limited to this. For example, the server apparatus 300 may collectively give notification of pieces of recognition information as described above as a past history when the server apparatus 300 accepts an instruction to display a piece of location information on a location of recognition of the presence of the bicycle (the battery pack 200A) from the user. Pieces of character information related to installation sites of the battery storage apparatuses 100A to 100C, such as addresses of the battery storage apparatuses 100A to 100C or battery storage apparatus names including pieces of information on the installation sites, may be displayed as pieces of location information of the battery storage apparatuses 100A to 100C on the screen 420.

Note that, for example, when the process in step S312 is performed, the information terminal 400 displays a history including not only a piece of location information on a location of most recent recognition of the presence of the bicycle (the battery pack 200A) but also a piece of location information on a location of earlier recognition of the presence of the bicycle (the battery pack 200A) on the screen 420 shown in (b) of FIG. 14. The present disclosure, however, is not limited to this. The information terminal 400 may display a screen based on a piece of location information included in a most recent one of pieces of apparatus information received by the information terminal 400. That is, for example, only a piece of location information indicated in (3) on the screen 420 may be displayed on a screen displayed on the display 402 in step S412, and only a piece of location information indicated in (2) on the screen 420 may be displayed on a screen displayed on the display 402 in step S408.

When the information terminal 400 accepts an instruction to display, on a map, a piece of location information on a location of recognition of the presence of the bicycle (the battery pack 200A) from the user on the screen 420 (see a tap with a finger shown in (b) of FIG. 14) after that, the information terminal 400 may display a screen 430 including a piece of map information, such as an icon 431, indicating a location of recognition of the presence of the bicycle (the battery pack 200A) on a map, as shown in (c) of FIG. 14. On the screen 430, the information terminal 400 displays a map location based on a piece of location information on a location of most recent recognition of the presence of the bicycle (the battery pack 200A) among pieces of location information on locations of past recognition of the presence of the bicycle (the battery pack 200A). Note that the information terminal 400 may display a map location based on a history of pieces of location information on locations of past recognition of the presence of the bicycle (the battery pack 200A) on the screen 430 in accordance with a user instruction. In this case, the information terminal 400 may also display a piece of information indicating transitions among the pieces of location information on the locations of recognition of the presence of the bicycle (the battery pack 200A) on a map. For example, the piece of information indicating the transitions among the pieces of location information may be arrows connecting the plurality of pieces of location information related to the bicycle (the battery pack 200A) displayed on the map or pieces of date and time information on dates and times of recognition of the presence of the battery pack 200A.

The information terminal 400 may store a plurality of pieces of apparatus information including a past piece of apparatus information in a memory (not shown), read out the pieces of apparatus information from the memory, and display a history or may receive a past piece of apparatus information other than a most recent piece of apparatus information from the server apparatus 300 and display a history.

1-4. Effects Etc.

As has been described above, the battery storage apparatus 100 according to the present embodiment receives an identifier for identification of the external battery pack 200 via the near field communicator 101 and then outputs a piece of data, in which the identifier and a piece of apparatus information on the battery storage apparatus 100 are associated with each other, to the server apparatus 300 via the communicator 102 if the external battery pack 200 is present within the communication range of the near field communicator 101. That is, the battery storage apparatus 100 receives an identifier of the external battery pack 200 present within the communication range of the near field communicator 101 and outputs a piece of data, in which the identifier of the external battery pack 200 and a piece of apparatus information on the battery storage apparatus 100 are associated with each other, to the server apparatus 300.

For this reason, a user can obtain a record of communication of the battery pack 200 with the battery storage apparatus 100 by, for example, inquiring a piece of data of the server apparatus 300. For example, if a piece of apparatus information output to the server apparatus 300 includes a piece of location information of the battery storage apparatus 100, the server apparatus 300 can estimate a location of the battery pack 200, and the user can know the location of the external battery pack 200. For example, if a piece of apparatus information output to the server apparatus 300 includes an identifier of the battery storage apparatus 100, and the server apparatus 300 holds in advance a piece of location information, in which the identifier of the battery storage apparatus 100 and a piece of location information of the battery storage apparatus 100 are associated with each other, the server apparatus 300 can estimate a piece of location information of the battery pack 200, and the user can know the piece of location information of the external battery pack 200. Thus, for example, even if the battery pack 200 owned by the user is stolen, the user can obtain a piece of information for recovering the stolen battery pack 200, and the battery storage apparatus 100 can reduce occurrence of a situation where the presence of the stolen battery pack 200 is unrecognizable.

The controller 103 outputs a piece of data, in which an identifier of the battery pack 200, a piece of date and time information on a date and time of reception of the identifier, and a piece of information on the battery storage apparatus 100 are associated with one another, to the server apparatus 300 via the communicator 102. This allows a user to know a piece of date and time information on a date and time of near field communication of the battery pack 200 with the battery storage apparatus 100.

The battery storage apparatus 100 includes the plurality of connectors 104 that are electrically connected to the plurality of battery packs 200, respectively, the power receiver 105 that is connected to an external power source and receives power for charging the battery pack 200 from the external power source, and the charger/discharger 106 that charges the battery pack 200 using power from the external power source. As described above, the battery storage apparatus 100 can charge the plurality of battery packs 200 using power from an external power source, and a user can use the battery storage apparatus 100 as an instrument for charging the battery pack 200.

The battery storage apparatus 100 further includes the charger/discharger 106 that discharges power from the battery pack 200 and the power feeder 107 that is connected to an external electrical instrument and feeds power from the plurality of battery packs 200 to the external electrical instrument via the charger/discharger 106. As described above, the battery storage apparatus 100 can feed power from the plurality of battery packs 200 to an external electrical instrument, and a user can use the battery storage apparatus 100 as, for example, an emergency power source.

When the controller 103 receives an identifier for identification of the external battery pack 200 and a piece of abnormality information indicating that the external battery pack 200 has an abnormality via the near field communicator 101 if the external battery pack 200 is present within the communication range of the near field communicator 101, the controller 103 outputs a piece of data, in which the received identifier and a piece of apparatus information on the battery storage apparatus 100 are associated with each other, and the received piece of abnormality information to the server apparatus 300 via the communicator 102. This allows a user to know that the external battery pack 200 has an abnormality.

Second Embodiment

A second embodiment will be described with reference to FIGS. 15 and 16.

2-1. Configuration

Figure 15:
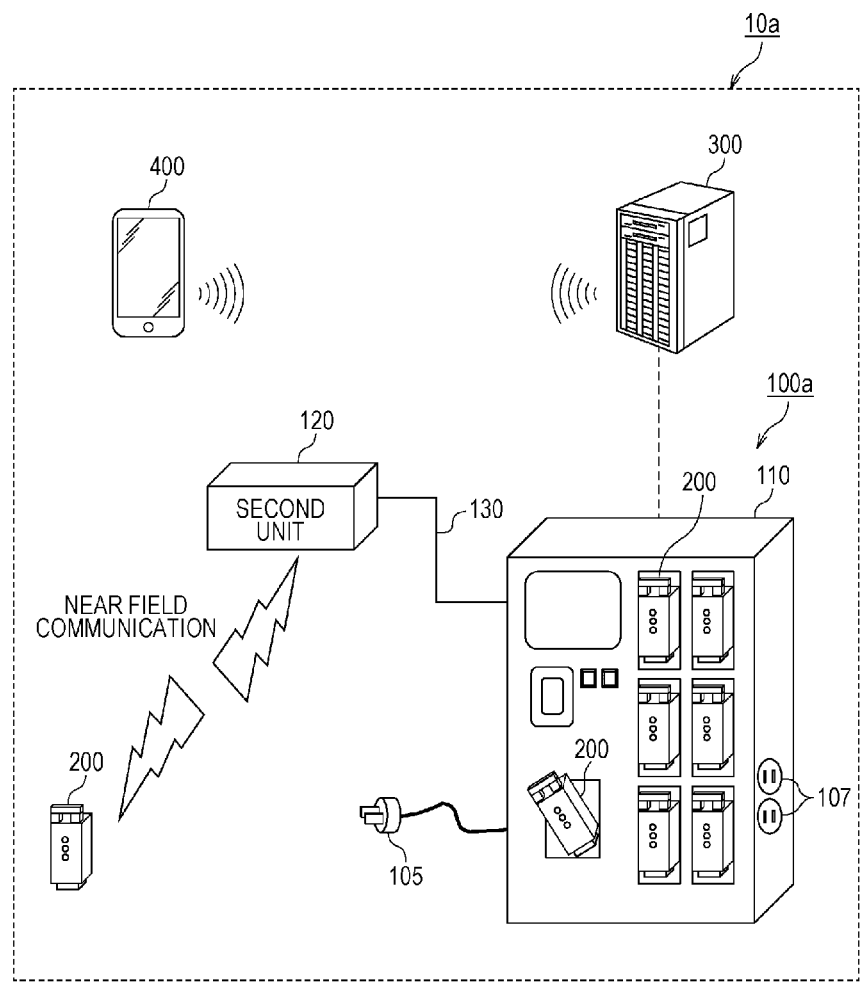
FIG. 15 is a schematic diagram showing the configuration of a management system including a battery storage apparatus according to a second embodiment.

FIG. 15 is a schematic diagram showing the configuration of a management system including a battery storage apparatus according to the second embodiment. FIG. 16 is a block diagram showing the configuration of the management system according to the second embodiment.

Figure 16:
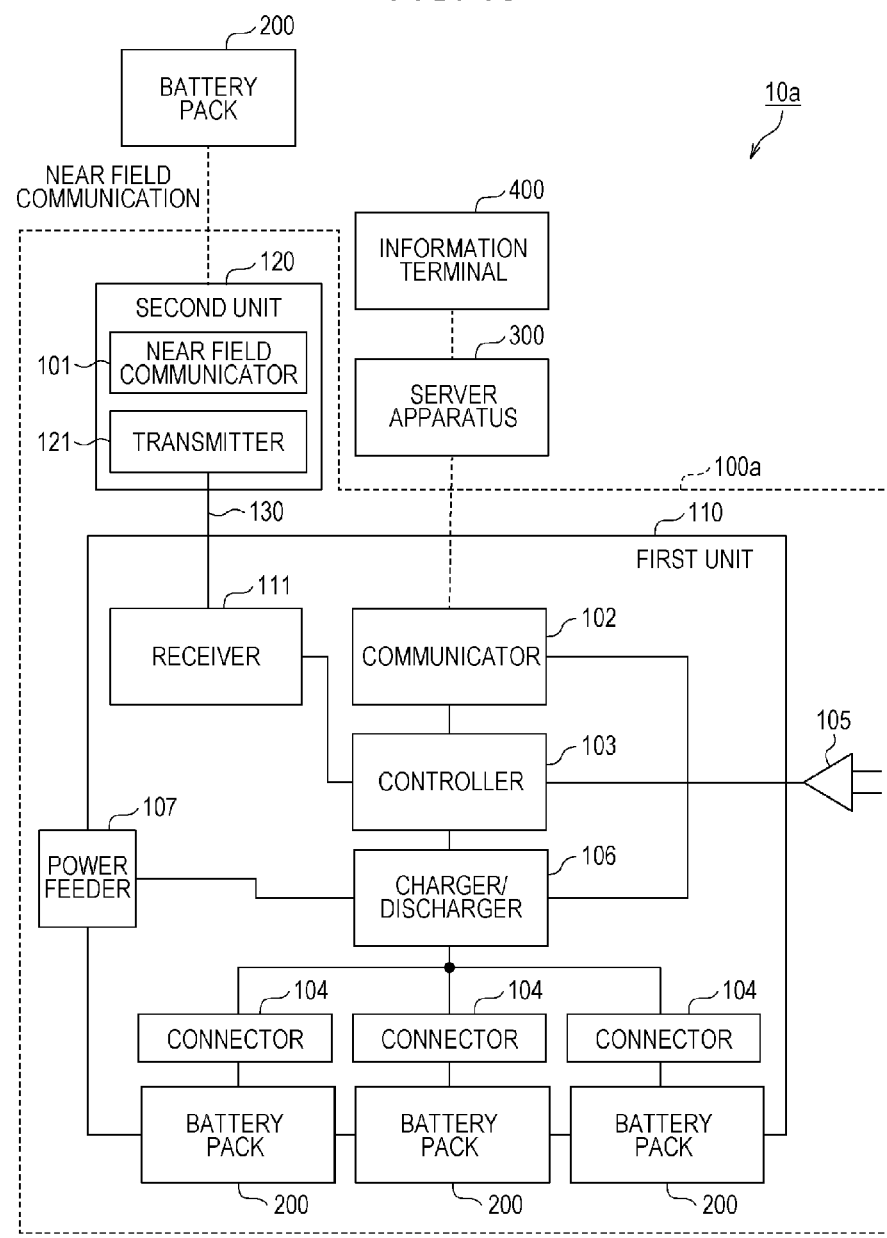
FIG. 16 is a block diagram showing the configuration of the management system according to the second embodiment.

A battery storage apparatus 100a in a management system 10a according to the second embodiment is different from the battery storage apparatus 100 according to the first embodiment in that constituent elements are separated into a first unit 110 and a second unit 120, as shown in FIGS. 15 and 16.

Only differences from the battery storage apparatus 100 according to the first embodiment will be described below.

The first unit 110 of the battery storage apparatus 100a includes a communicator 102, a controller 103, a plurality of connectors 104, a power receiver 105, a charger/discharger 106, a power feeder 107, and a receiver 111. The first unit 110 is a unit which is provided indoors. The first unit 110 is provided, for example, inside a building constituting a store, such as a convenience store. Note that the communicator 102, the controller 103, the plurality of connectors 104, the power receiver 105, the charger/discharger 106, and the power feeder 107 are the same as those in the first embodiment, and a description thereof will be omitted.

The receiver 111 receives an identifier of a battery pack 200 transmitted from a transmitter 121 which is provided in the second unit 120 (to be described later).

When the controller 103 receives an identifier from the receiver 111, the controller 103 outputs a piece of association data, in which the identifier and a piece of apparatus information on the battery storage apparatus 100a are associated with each other, to a server apparatus 300 via the communicator 102.

Figure 17:
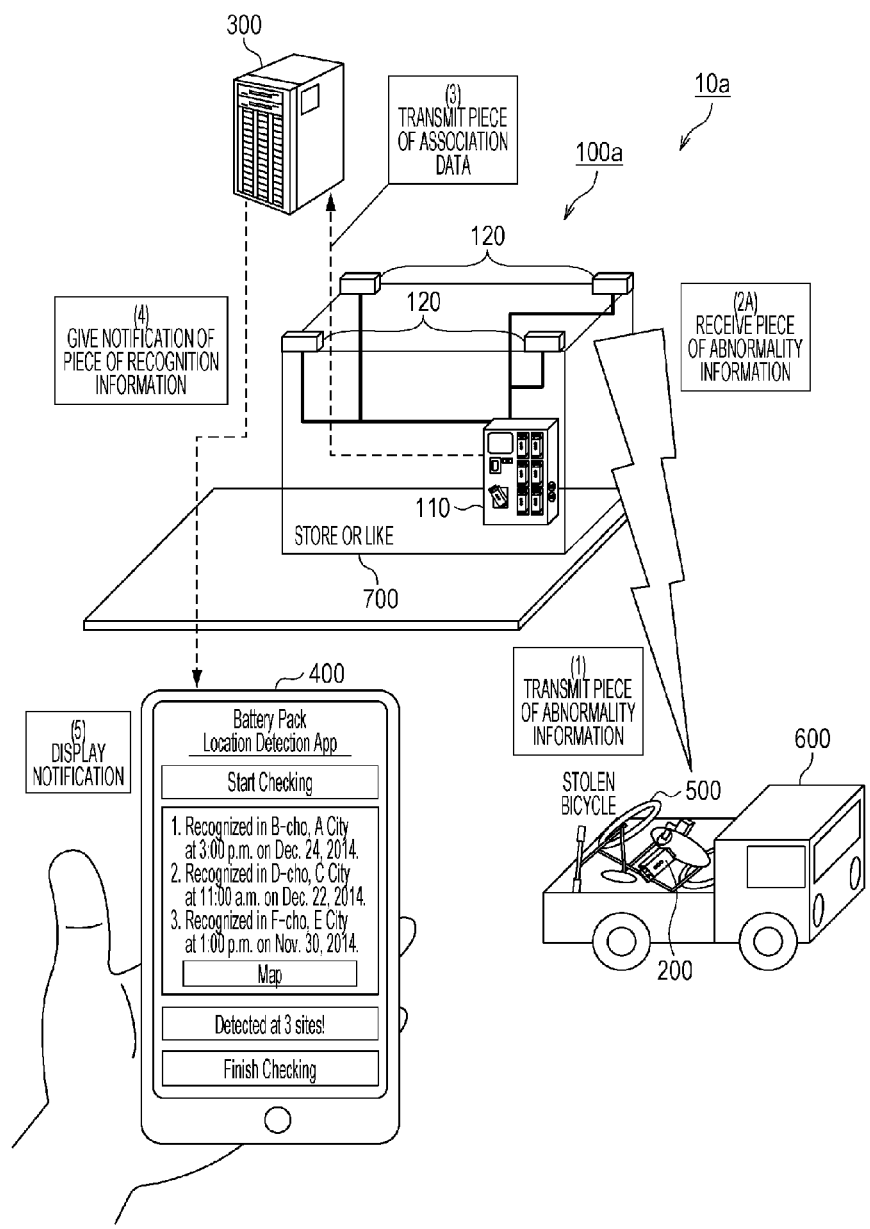
FIG. 17 is a diagram for explaining an overview of the operation of the management system according to the second embodiment.

The second unit 120 includes a near field communicator 101 and the transmitter 121. The second unit 120 is a unit which is provided outdoors. The second unit 120 is provided, for example, outside the building constituting the store, such as a convenience store, and is provided on an outer wall or a roof of the building, in a parking space of the store, or the like. Although only one second unit 120 is provided in one battery storage apparatus 100a in FIG. 16, a plurality of second units 120 may be provided in one battery storage apparatus 100a, as shown in FIG. 17 (to be described later). Note that the near field communicator 101 is the same as that in the first embodiment, and a description thereof will be omitted.

The transmitter 121 transmits an identifier of the external battery pack 200 received via the near field communicator 101 to the receiver 111 of the first unit 110.

In the second embodiment, the receiver 111 of the first unit 110 and the transmitter 121 of the second unit 120 are electrically connected by a communication line 130. Note that communication between the receiver 111 of the first unit 110 and the transmitter 121 of the second unit 120 is not limited to wired communication and may be wireless communication.

An operation to be performed by the battery storage apparatus 100a according to the second embodiment is the same as an operation to be performed by the battery storage apparatus 100 according to the first embodiment, and a description of the operation will be omitted.

2-2. Operation

An overview of the operation of the management system 10a with the above-described configuration will be described below with reference to FIG. 17.

FIG. 17 is a diagram for explaining the overview of the operation of the management system according to the second embodiment. More specifically, FIG. 17 is a diagram for explaining an operation to be performed in the management system 10a if a movable body 500 provided with the battery pack 200 is stolen, and the battery pack 200 has an abnormality, as in FIGS. 6A and 6B for the first embodiment. Note that operations other than an operation shown in (2A) of FIG. 17 are the same as those described with reference to FIGS. 6A and 6B, and a detailed description thereof will be omitted.

When the battery pack 200 transmits a piece of abnormality information related to the battery pack 200 to the battery storage apparatus 100 in (1) of FIG. 17, a plurality of second units 120 provided in the battery storage apparatus 100a receive a piece of pack information including the piece of abnormality information transmitted from the battery pack 200, as shown in (2A) of FIG. 17. Note that one of the plurality of second units 120 may receive the piece of abnormality information from the battery pack 200 or the plurality of second units 120 may receive the piece of abnormality information from the battery pack 200 in cooperation with one another.

More specifically, the idea of giving priority to a signal received by the second unit 120 in good radio wave condition for communication with the battery pack 200 in near field communication with the battery pack 200 is conceivable. For example, if the battery pack 200 is moving, and the second unit 120 in best radio wave condition among the plurality of second units 120 changes from one to another, priority may be given to a signal received by the second unit 120 in best radio wave condition after the change. That is, the plurality of second units 120 may receive a piece of abnormality information from the battery pack 200 in cooperation with one another by selecting a signal received by the second unit 120 in best radio wave condition for communication with the battery pack 200 among the plurality of second units 120.

2-3. Effects Etc.

As has been described above, the battery storage apparatus 100a according to the present embodiment is separated into the first unit 110 arranged indoors and the second unit 120 arranged outdoors, and the second unit 120 that performs near field communication can be arranged outdoors. For this reason, the battery storage apparatus 100a can sensitively perform near field communication with the external battery pack 200.

Other Embodiments

As described above, the embodiments have been described as examples of a technique disclosed in the present disclosure. The technique in the present disclosure, however, is not limited to this and can also be applied to embodiments in which changes, replacements, additions, omissions, and the like are made as necessary. Constituent elements described in the embodiments may be combined together to obtain a new embodiment.

For this reason, other embodiments will be illustrated below.

For example, each of the above-described embodiments has described, as an example of an abnormality in the battery pack 200, a case where the battery pack 200 is stolen. The present disclosure, however, is not limited to this. For example, if the battery pack 200 is provided with a gyro sensor, it may be judged that the battery pack 200 has an abnormality when the battery pack 200 is greatly tilted at a predetermined angle or more with respect to a state in which the battery pack 200 is installed in an electrical instrument. For example, if the battery pack 200 is provided with a temperature sensor, it may be judged that the battery pack 200 has an abnormality if the battery pack 200 is in an environment at a high temperature not less than a predetermined temperature. For example, if the battery pack 200 is provided with an acceleration sensor, it may be judged that the battery pack 200 has an abnormality if the battery pack 200 is moving with high acceleration higher than predetermined acceleration.

In each of the embodiments, the battery pack 200 judges whether the battery pack 200 has an abnormality. The battery storage apparatus 100 or 100a, however, may make a judgment. That is, at this time, the controller 203 of the battery pack 200 transmits a piece of information on the battery pack 200, such as a piece of information as to whether user authentication is successful, a detection result from a gyro sensor, a detection result from a temperature sensor, or a detection result from an acceleration sensor, to the battery storage apparatus 100 together with an identifier of the battery pack 200. The battery storage apparatus 100 may judge, on the piece of information on the battery pack 200, whether the battery pack 200 has an abnormality. The server apparatus 300 may judge whether the battery pack 200 has an abnormality. More specifically, the judgment to be made by the controller 203 of the battery pack 200 is made by the controller 301 of the server apparatus 300.

In each of the embodiments, even if the battery pack 200 has no abnormality, when the battery pack 200 is present within the communication range of the near field communicator 101 of the battery storage apparatus 100 or 100a, the battery pack 200 establishes wireless connection with the near field communicator 101 and transmits an identifier of the battery pack 200. The present disclosure, however, is not limited to this. For example, only if the battery pack 200 has an abnormality, when the battery pack 200 is present within the communication range of the near field communicator 101 of the battery storage apparatus 100 or 100a, the battery pack 200 may establish wireless connection with the near field communicator 101 and transmit an identifier of the battery pack 200 and a piece of abnormality information. If the battery pack 200 is one which establishes wireless connection with the near field communicator 101 only when the battery pack 200 has an abnormality, the battery pack 200 need not transmit a piece of abnormality information in addition to an identifier and may transmit the identifier as a piece of abnormality information. In short, the battery storage apparatus 100 or 100a receives an identifier only from the battery pack 200 with an abnormality and transmits a piece of association data, in which the identifier of the battery pack 200 with an abnormality and a piece of apparatus information are associated with each other, to the server apparatus 300. As described above, since the battery pack 200 does not establish wireless connection even when the battery pack 200 is present within the communication range of the near field communicator 101 of the battery storage apparatus 100 or 100a if the battery pack 200 has no abnormality, power consumption can be reduced.

In each of the embodiments, when the battery pack 200 is present within the communication range of the near field communicator 101 of the battery storage apparatus 100 or 100a, the battery storage apparatus 100 or 100a receives an identifier of the battery pack 200 by transmitting a request for reception of an identifier to the battery pack 200. The present disclosure, however, is not limited to reception of the identifier of the battery pack 200 by means of transmission of a request for reception. For example, the battery pack 200 may voluntarily transmit an identifier of itself to the battery storage apparatus 100 when the battery pack 200 is present within the communication range of the near field communicator 101 of the battery storage apparatus 100 to establish wireless connection with the battery storage apparatus 100.

Note that, in each of the embodiments, each constituent element may be implemented as dedicated hardware or may be implemented by executing a software program suitable for the constituent element. Each constituent element may be implemented by reading out and executing a software program recorded in a recording medium, such as a hard disk or a semiconductor memory, by a program execution section, such as a CPU or a processor.

Although a battery pack and a charging apparatus according to one or more aspects of the present disclosure have been described above on the basis of the embodiments, the present disclosure is not limited to the embodiments. Various modifications to the embodiments that can be conceived by those skilled in the art, forms configured by combining constituent elements in different embodiments, and the like without departing from the spirit of the present disclosure may be included in the scope of the one or more aspects of the present disclosure.

The present disclosure is applicable to a battery storage apparatus or the like which can reduce occurrence of a situation where the presence of a stolen battery pack is unrecognizable.

What is claimed is:

1. A method comprising:
   receiving, by a near field communicator provided in a battery storage apparatus storing an internal battery pack, an identifier of an external battery pack that is transmitted by the external battery pack, when the external battery pack is present within a communication range of the near field communicator, the external battery pack being disposed outside of the battery storage apparatus; and
   outputting, by a communicator provided in the battery storage apparatus to a server apparatus, a piece of association data, in which the received identifier of the external battery pack and a piece of apparatus information of the battery storage apparatus, which received the identifier of the external battery pack, are associated with each other,
   wherein the identifier of the external battery pack is unique to the external battery pack, such that the identifier of the external battery pack is different from an identifier of the internal battery pack, and
   wherein the identifier of the external battery pack is received when the external battery pack is passing in front of the battery storage apparatus, and when the external battery pack is present within the communication range of the near field communicator.

2. The method according to claim 1, wherein
   the outputting includes outputting a piece of data, in which the identifier of the external battery pack, a piece of date and time information on a date and time of reception of the identifier of the external battery pack, and the piece of apparatus information are associated with one another, as the piece of association data.

3. The method according to claim 1, further comprising:
   receiving power for charging the internal battery pack from an external power source via a power receiver provided in the battery storage apparatus; and
   charging the internal battery pack connected to a connector that is provided in the battery storage apparatus and electrically connected to the internal battery pack via a charger provided in the battery storage apparatus, using the power received from the external power source.

4. The method according to claim 1, further comprising:
   feeding power of the internal battery pack to an external electrical instrument via a discharger connected to the external electrical instrument and provided in the battery storage apparatus.

5. The method according to claim 1, wherein
   the receiving of the identifier of the external battery pack includes receiving a piece of abnormality information indicating that the external battery pack has an abnormality in at least one of authentication, temperature and motion in addition to the identifier of the external battery pack, and
   the outputting includes outputting the piece of association data and the received piece of abnormality information.

6. The method according to claim 1, wherein
   the receiving of the identifier of the external battery pack includes receiving a piece of abnormality information indicating that the external battery pack is a stolen battery pack in addition to the identifier of the external battery pack, and
   the outputting includes outputting the piece of association data and the received piece of abnormality information.

7. The method according to claim 1, wherein
   the battery storage apparatus includes:
   a first unit that includes:
      the communicator,
      a receiver,
      a controller, and
      a storage that stores the internal battery pack,
      the first unit being provided interior of the battery storage apparatus, and
   a second unit that includes:
      the near field communicator, and
      a transmitter,
      the second unit being provided exterior of the battery storage apparatus,
   and
   the method further comprises receiving, via the receiver provided in the first unit, the identifier of the external battery pack transmitted from the transmitter provided in the second unit after the receiving of the identifier of the external battery pack by the near field communicator, and
   the outputting includes outputting, by the communicator provided in the first unit, the piece of association data, in which the identifier of the external battery pack and the piece of apparatus information on the battery storage apparatus are associated with each other, upon receipt of the identifier of the external battery pack by the receiver.

8. A battery storage apparatus which stores a battery pack, the battery storage apparatus comprising:
   a near field communicator which performs a near field communication with an external battery pack, the external battery pack including a first communicator and located outside of the battery storage apparatus;
   a second communicator which communicates with a server apparatus; and
   control circuitry which receives, by the near filed communicator, an identifier of the external battery pack transmitted by the first communicator of the external battery pack when the external battery pack is present within a communication range of the near field communicator, and controls the second communicator to output, to the server apparatus, a piece of association data, in which the identifier of the external battery pack and a piece of apparatus information of the battery storage apparatus are associated with each other,
   wherein the identifier of the external battery pack is unique to the external battery pack, such that the identifier of the external battery pack is different from an identifier of the battery pack stored in the battery storage apparatus, and
   wherein the identifier of the external battery pack is received when the external battery pack is passing in front of the battery storage apparatus, and when the external battery pack is present within the communication range of the near field communicator.

9. A method comprising:
   receiving, at an information terminal and from a server, a piece of location information of a battery storage apparatus which stores a battery pack, the location information indicating a location of the battery storage apparatus at a time of presence of an external battery pack within a communication range for near field communication of the battery storage apparatus; and displaying the received piece of location information of the battery storage apparatus on a display of the information terminal, wherein the external battery pack is located outside of and apart from the battery storage apparatus at the time of presence, the external battery pack is designated by the information terminal, and the location information corresponds to a geographical location, wherein the identifier of the external battery pack is unique to the external battery pack, such that the identifier of the external battery pack is different from an identifier of the battery pack stored in the battery storage apparatus, and wherein the identifier of the external battery pack is received when the external battery pack is passing in front of the battery storage apparatus, and when the external battery pack is present within the communication range of the near field communicator.

10. The method according to claim 9, wherein the receiving includes receiving a piece of date and time information of the time of presence of the external battery pack in addition to the piece of location information of the battery storage apparatus, and the displaying includes displaying the piece of location information of the battery storage apparatus and the piece of date and time information.

11. The method according to claim 9, wherein the displaying includes displaying, as a history, a piece of data, in which the piece of location information of the battery storage apparatus and a piece of date and time information of the time of presence of the external battery pack are associated with each other, on a basis of the piece of date and time information.

12. The method according to claim 9, further comprising:

receiving a piece of abnormality information indicating that the external battery pack has an abnormality in at least one of authentication, temperature and motion, wherein the receiving of the piece of location information of the battery storage apparatus is executed upon receipt of a request to receive the piece of location information of the battery storage apparatus from the information terminal after the receiving of the piece of abnormality information.

13. The method according to claim 9, further comprising:

receiving a piece of abnormality information indicating that the external battery pack has an abnormality in at least one of authentication, temperature and motion, wherein the displaying is executed upon receipt of a request for execution of the displaying after the receiving both the piece of location information of a battery storage apparatus and the piece of abnormality information.

14. The method according to claim 9, further comprising:

receiving a piece of abnormality information indicating that the external battery pack has an abnormality in at least one of authentication, temperature and motion; and displaying the piece of abnormality information on the display.

15. The method according to claim 9, further comprising:

receiving a piece of information indicating that the external battery pack is a stolen battery pack, wherein the receiving of the piece of location information of the battery storage apparatus is executed upon receipt of a request to receive the piece of location information of the battery storage apparatus from the information terminal after the receiving of the piece of abnormality information.

16. The method according to claim 9, further comprising:

receiving a piece of abnormality information indicating that the external battery pack is a stolen battery pack, wherein the displaying is executed upon receipt of a request for execution of the displaying after the receiving both the piece of location information of the battery storage apparatus and the piece of abnormality information.

17. The method according to claim 9, further comprising:

receiving a piece of abnormality information indicating that the external battery pack is a stolen battery pack; and displaying the piece of abnormality information on the display.

18. The method according to claim 1, wherein the communication range of the near field communicator covers the external battery pack passing in front of the battery storage apparatus.

* * * * *